United States Patent
Khalid et al.

(10) Patent No.: US 11,411,533 B1
(45) Date of Patent: Aug. 9, 2022

(54) MOVING LINEAR REGRESSION BASED POWER FIRMING FILTER

(71) Applicant: King Fahd University of Petroleum and Minerals, Dhahran (SA)

(72) Inventors: Muhammad Khalid, Dhahran (SA); Miswar Akhtar Syed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 17/713,617

(22) Filed: Apr. 5, 2022

Related U.S. Application Data

(60) Provisional application No. 63/273,399, filed on Oct. 29, 2021.

(51) Int. Cl.
| | |
|---|---|
| *H01M 10/44* | (2006.01) |
| *H02S 40/38* | (2014.01) |
| *H02J 7/35* | (2006.01) |
| *H02M 1/14* | (2006.01) |
| *H02S 99/00* | (2014.01) |
| *G06N 20/00* | (2019.01) |

(52) U.S. Cl.
CPC ............ *H02S 40/38* (2014.12); *H02J 7/35* (2013.01); *H02M 1/14* (2013.01); *H02S 99/00* (2013.01); *G06N 20/00* (2019.01); *H02J 2300/24* (2020.01)

(58) Field of Classification Search
None
See application file for complete search history.

(56) References Cited

U.S. PATENT DOCUMENTS

| | | | |
|---|---|---|---|
| 2005/0243584 A1* | 11/2005 | Abe ................. | H02M 7/493 363/71 |
| 2015/0061696 A1* | 3/2015 | Dahmani ........... | G01N 29/28 73/645 |
| 2019/0148945 A1* | 5/2019 | Nakayama ......... | H02J 7/0021 700/291 |

OTHER PUBLICATIONS

Syed, et al. ; Locally Weighted Filtering for Photovoltaic Power Fluctuation Control and Time Delay Reduction with Battery Energy Storage ; 2021 IEEE Madriud PowerTech.
Daud, et al. ; An improved control method of battery energy storage system for hourly dispatch of photovoltaic power sources ; Energy Conversion and Management 73 ; pp. 256-270 ; 2013.
Ellis, et al. ; PV Output Smoothing with Energy Storage ; Sandia National Laboratories ; Sandia Report Mar. 2012.
Pandey, et al. ; Battery State of Charge Modeling for Solar PV Array using Polynomial Regression ; Electrical Engineering and Sytems Science ; System and Control ; Dec. 7, 2020.

\* cited by examiner

*Primary Examiner* — Arun C Williams
(74) *Attorney, Agent, or Firm* — Obion, McClelland, Maier & Neustadt, L.L.P.

(57) ABSTRACT

A system, method, and solar photovoltaic (PV) network for solar PV variability reduction with reduced time delays and battery storage optimization are described. The system includes a Moving Regression (MR) filter; a State of Charge (SoC) feedback control; and a Battery Energy Storage System (BESS). The MR filter, SoC feedback control and BESS are configured to provide smoothing of solar PV variabilities. The MR filter is a non-parametric smoother that utilizes a machine learning concept of linear regression to smooth out solar PV variations at every time step.

16 Claims, 42 Drawing Sheets

MOVING LINEAR REGRESSION BASED POWER FIRMING FILTER

CROSS-REFERENCE TO RELATED APPLICATION

The present application claims benefit of priority to U.S. Provisional Application No. 63/273,399, having a filing date of Oct. 29, 2021, which is incorporated herein by reference in its entirety.

STATEMENT OF PRIOR DISCLOSURE BY AN INVENTOR

Aspects of the present disclosure are described in Syed et al., "Moving Regression Filtering with Battery State of Charge Feedback Control for Solar PV Firming and Ramp Rate Curtailment," IEEE Access, 18 Jan. 2021, DOI: 10.1109/ACCESS.2021.3052142, which is incorporated herein by reference in its entirety.

BACKGROUND OF THE INVENTION

Technical Field

The present disclosure is directed to a system and a method for solar photovoltaic (PV) variability reduction, reduced time delays and battery storage optimization using a moving linear regression based power firming filter combined with state of charge feedback control.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

With the global population growth, demand for energy is also increasing to fulfill basic needs of the population. There are two sources of energy i.e., one is renewable energy sources and other one is non-renewable energy sources (such as fossil fuels). The use of non-renewable energy sources can cause problems such as environmental pollution and depletion of the source itself, therefore renewable energy sources can be preferable over the non-renewable energy sources.

Solar Photovoltaic (PV) power plants are a widespread choice for the renewable energy source, as solar energy is available and is comparatively inexpensive. The solar PV power plants comprise a large number of solar PV modules that convert solar energy into Direct Current (DC) electric power. Using a DC-Analog Current (AC) inverter, the generated DC power is converted into AC electric power. The inverted AC electric power is then injected into a power grid.

Due to the large-scale penetration of intermittent PV power modules, multiple variabilities occur in the power grid, such as frequency issues and voltage deviations. To counteract such issues, Battery Energy Storage System (BESS) can be integrated into the power grid as the BESS can assist in reducing the PV fluctuations and provide optimal operation. A storage system stores renewable energy or residual energy of the power grid in a battery, and supplies power to a load when needed. Storage systems are expensive and smoothing filters coupled with the BESS can provide cost reduction and power smoothing.

Existing solutions employ traditional filters such as Low Pass Filters (LPF), Moving Average (MA), and Moving Median (MM) for solar power smoothing. However, these filters have inadequate power tracking capabilities particularly with larger window sizes and time constants, which subsequently depreciates the storage system performance. To compensate for the delayed power tracking, larger energy storage systems are required, which in turn adds to the overall operational costs.

Accordingly, it is one object of the present disclosure to provide a system and a method for reducing solar PV variability and optimizing the battery storage in an accurate and cost-efficient manner.

SUMMARY

In an exemplary embodiment, a solar photovoltaic (PV) network is disclosed. The solar photovoltaic (PV) network includes a PV module, a Moving Regression (MR) filter, a State of Charge (SoC) feedback control, a Battery Energy Storage System (BESS), and an electrical grid.

In an exemplary embodiment, a system for solar PV variability reduction, reduced time delays and battery storage optimization is disclosed. The system includes a Moving Regression (MR) filter, a State of Charge (SoC) feedback control, and a Battery Energy Storage System (BESS). The PV module comprises a PV array that receives solar light signals and generates unsmoothed solar PV power output that is coupled to the MR filter and the SoC feedback control. Outputs of the MR filter, the SoC feedback control and the BESS are combined to generate a smoothed solar PV power output, wherein the smoothed solar PV power output is coupled to the electrical grid. The MR filter is a non-parametric smoother that utilizes a machine learning concept of linear regression to smooth out solar PV variations at every time step.

In another exemplary embodiment, a method of providing a solar photovoltaic (PV) power to an electrical grid is disclosed. The method includes receiving solar signals by a PV module. The method further includes generating, by the PV module, an unsmoothed solar PV power output power ($P_{PV}$), and coupling the $P_{PV}$ to a MR filter and to a SoC feedback control. The method further includes generating a filter smooth output power ($P_{PO}$) by the MR filter. The method further includes generating a power reference output ($P_{ref}$) by combining $P_{PO}$ and an output of the SoC feedback control and coupling $P_{ref}$ to a Battery Energy Storage System (BESS), wherein BESS generates a BESS power output ($P_{BESS}$). The method further includes generating an output grid power ($P_{grid}$) by combining $P_{BESS}$ and another output of the SoC feedback control. The method further includes receiving output grid power $P_{grid}$ by the electrical grid.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
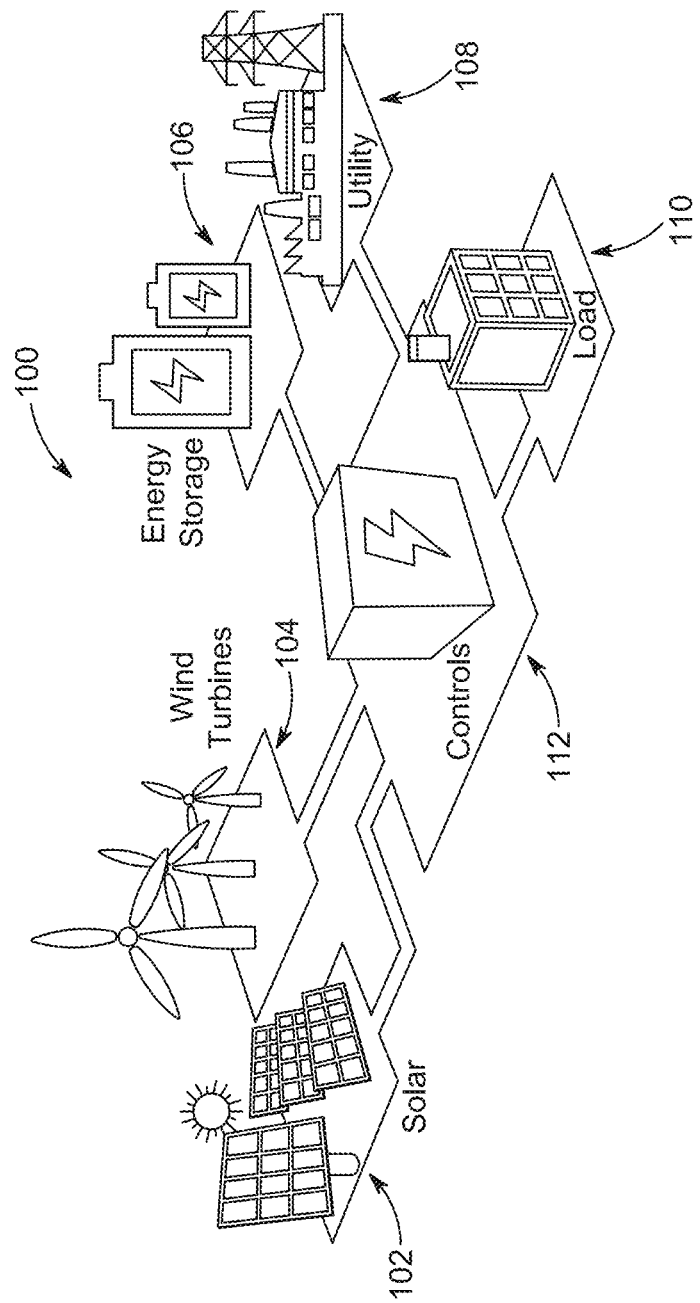
FIG. 1 illustrates a microgrid system, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for reducing solar photovoltaic (PV) variability with reduced time delays and battery storage optimization. The disclosure employs a moving regression (MR) filter combined with a state of charge (SoC) feedback control and a Battery Energy Storage System (BESS) for reducing solar PV variability, time delays, ramp rates and decreasing battery charging and discharging power. The present disclosure discloses that the MR filter achieves better solar power smoothing without increasing the BESS capacity as compared with prior art solutions such as, but not limited to, Low Pass Filters (LPF), Moving Average (MA), and Moving Median (MM), double moving average (DMA), and Savitsky-Golay (SG) filters. Further, the performance of the MR filter is less affected with the increase in window sizes.

In various aspects of the disclosure, non-limiting definitions of one or more terms that will be used in the document are provided below.

A term "power output smoothing filter" or simply "smoothing filter" is equivalent to "power firming filter". LPF, MA, MM, DMA, SG, and MR filters are power output smoothing filters.

A term "power tracking" refers to a feature where the PV panels are directed towards the sun. With power tracking, PV panels can change their orientation throughout the day to follow the sun's path to maximize energy capture.

A term "power lag" can be defined relative to a "power factor". A power factor is a measure of the phase difference between the voltage and current in an AC power system. In purely resistive loads (such as an incandescent lightbulb or electric kettle), the current is in phase with the voltage and there is 'unity' power factor. Capacitive and inductive loads (such as a capacitor banks or inductive motor respectively) can cause the current to 'lead' or 'lag' the voltage, resulting in a 'non-unity' power factor. In some aspects, increasing a window size can improve the smoothing performance, but can also cause an increase in power lagging.

The term "ramp rate" of the PV power is important to determine the capacity of the energy storage for dispatching smoothed PV power to the grid. Ramping refers to a change in power flow (or power generation) from one time unit to the next. Ramping restrictions limit the allowed net flow variations on consecutive hours on specific lines. Ramping restrictions can include information about flow in the last hour from the previous day in the calculation.

The term "window size" may be described as follows: The selection of a window size for a filter can be useful to analyze data. For example, when using a moving average filter with noisy data, selection of a larger window size can obtain smoother data. However, the smoother data may be less realistic.

The term "power grid" or "electrical grid" refers to an interconnected network for electricity delivery from producers to consumers. The power grid consists of a multitude of complex interconnections and provides electricity generation, transmission and distribution. As used herein, "electrical grid" or "power grid" may be referred to as simply a "grid". From a location point of view, in a traditional network, the grid may be referred to as a "main grid". The term "microgrid" refers to a local energy grid with control capability, which can be disconnected from the main grid and operate autonomously.

Solar PV plants generate intermittent power due to variations in the sunlight, triggered by shifting clouds. The subsequent fluctuating power creates mechanical complications with the automatic voltage controller, affects the process of the low voltage grid, causes frequency deviations and voltage issues, results in tap changer and power system failures that leads to utility damages and even grid shutdowns. So, to improve the permeation of large-scale solar power into the grid, the PV power output needs to be flattened, i.e., smoothed, before it can be infused into the main grid.

Several smoothing filter methodologies combined with BESS and control systems have been described to smooth out solar and wind power fluctuations. As previously noted, some commonly used filtering techniques such as Low Pass Filters (LPF), Moving Average (MA), and Moving Median (MM), double moving average (DMA), gaussian filter (GF) and Savitsky-Golay (SG) filters, with longer time constants and larger window sizes, are potential solutions for solar power smoothing, but at the cost of causing a significant time delay. This time delay results in high charging/discharging power and frequent SoC changes of the battery, thereby increasing the capacity of the battery required and additionally reducing the lifetime of the battery used. Moreover, filters such as GFs tend to over smooth the PV profile thereby losing the wave characteristics which must be compensated by requiring additional power from the battery which in turn negatively affects the battery by decreasing its life duration.

The objective of embodiments of the present disclosure can be stated as follows: To smooth the solar power output fluctuations with minimum time delay, to decrease battery charging/discharging power, to provide proper SoC management and optimal battery storage capacity subjected to practical physical system constrains and optimum battery operation. The resulting smoothed power output not only assists in dispatching power that complies with the grid code, but also raises the overall advantages of the PV power as it becomes more controllable. FIG. 1 illustrates a block diagram of a microgrid system 100 with energy storage system 106 for providing uninterrupted power and balancing load demands for an area having varying power needs, according to one or more aspects of the present disclosure.

Referring to FIG. 1, the microgrid system 100 includes at least one electricity generation unit (e.g., solar power plant 102, wind power turbine 104), an energy storage system 106, a utility 108, a load system 110, and a control system 112. The construction of microgrid system 100 is similar to that of a known microgrid, and thus the construction is not explained in detail for the sake of brevity. The at least one electricity generation unit (solar power plant 102, wind power turbine 104) is configured to generate electricity and further configured to feed the generated electricity into a main grid for distribution. The electricity generation unit (solar power plant 102, wind power turbine 104) may be a solar power plant, a wind power plant, a small hydro-power plant, a biomass-power plant, any renewable electricity generation unit, or a combination thereof.

In an aspect, the solar power plant 102 includes a plurality of PV modules and a DC/DC voltage stabilizing module, such that the solar energy is converted into electric energy and transmitted to the direct current bus using the DC/DC voltage stabilizing module. Each of the PV modules includes a PV array and a boost converter.

In an aspect, the wind turbines 104 is configured to convert the wind energy into electric energy. The wind turbines 104 includes a synchronous generator, an AD/DC rectifier and a DC/DC voltage stabilizing module which are sequentially connected to convert the wind energy into the electric energy.

The energy storage system 106 includes an energy storage battery pack and a variable flow control unit for storing electric energy provided by the solar power plant 102 and the wind turbines 104 and is further configured to provide the electric energy for the direct current bus. The energy storage system 106 is configured to increase energy efficiency by storing generated electric energy by each connected system including the electricity generation unit (solar power plant 102, wind power turbine 104), substations, and transmission lines. Further, the energy storage system 106 is configured to selectively and efficiently use the stored electric energy when the electric energy is needed. In an aspect, the energy storage system 106 may include a lead-acid battery, a redox flow battery, a sodium-sulfur battery, a lithium-ion battery, an ultracapacitor, etc.

In an operative embodiment, the utility 108 is a commercial electric power distribution system. The utility 108 is configured to receive generated electric energy (electricity) from at least one electricity generation unit (solar power plant 102, wind power turbine 104), and the energy storage system 106, and is further configured to transmit the received electricity over a certain distance via transmission lines. Further, the utility 108 is configured to distribute the electricity to the consumer through a distribution system. In some embodiments, utility 108 may be referred to as the main grid.

End points of the utility 108 are consumer locations when electricity is used to turn on various equipment such as the lights, television, dishwasher or such equipment's (acting as a load for the utility). The load system 110 is the total demand for power in the grid by various consumers. In an aspect, the load system 110 includes a commercial load, a household load, a factory load, etc. In another aspect, the load system 110 varies by hour, day, and season. For example, during summer, air conditioners are heavily used, thereby increasing load demand of the load system 110. The pattern of living also contributes to a varying demand for electricity on the load system 110.

In an aspect, the microgrid system 100 includes the control system 112 for operating one or more modules/units/subsystems of the microgrid system 100 in a safe and an effective way. The utility 108 serves millions of consumers and has a considerable amount of load that may change in rapidly and uncontrolled way. Therefore, the control system 112 is configured for proper monitoring and operations of the various units of the microgrid system 100. In an aspect, the control system 112 may include multiple controllers and sensors distributed over in the area of the microgrid system 100. In an aspect, the control system 112 may include a Supervisory Control and Data Acquisition (SCADA) system that collects data and distributes the instructions accordingly. The control system 112 may be configured to maximize the use of renewable energy sources (taking demand, for example, due to weather in the consideration and other factors), minimizing the dependencies on fossil fuel, and maintaining the reliability of all the units of the microgrid system 100, while matching the load requirements. In an aspect, the control system 112 is configured to monitor load demand and accordingly manage the distribution of the electricity over a network among all the consumers. In an aspect, the control system 112 includes network health monitoring capabilities and adaptability to compensate for element failures. If the main grid, i.e., utility 108, fails, the microgrid system 100 is employed to fulfill the power supply requirements of the consumers, attached with the main grid. As the electric power generated by the microgrid system 100 is limited, the control system 112 is configured to utilize the capacity of the microgrid system 100 such that the power supply requirements in the system are not affected. The control system 112 is configured to improve the stability of the microgrid system 100 by coordinating with all the energy generation units of the microgrid system 100.

In an operative aspect, the present disclosure discloses a system for solar PV variability reduction with reduced time delays and battery storage optimization. The system includes the PV module, an energy storage module having a battery and a DC-DC converter. The present system also contains a DC-AC inverter to dispatch the power into a grid.

The SoC feedback controller is connected with the battery system and a smoothing algorithm. The purpose of the smoothing algorithm and the battery system is to smooth the PV output power as solar irradiance and ambient temperature are uncontrolled in nature. The difference between the real PV power and the output from the smoothing topology will be responsible for charging and discharging the battery system. The resultant power of real PV and the battery output represents the smoothed power, which can be injected into the grid. The system is configured to smooth the fluctuated PV power, whereas controlling the battery ramp rate using the filter. Smoothing of the fluctuated power not only helps to dispatch a power that complies with the grid standard but maximizes the total benefits of the PV power as it becomes more controllable.

Figure 2:
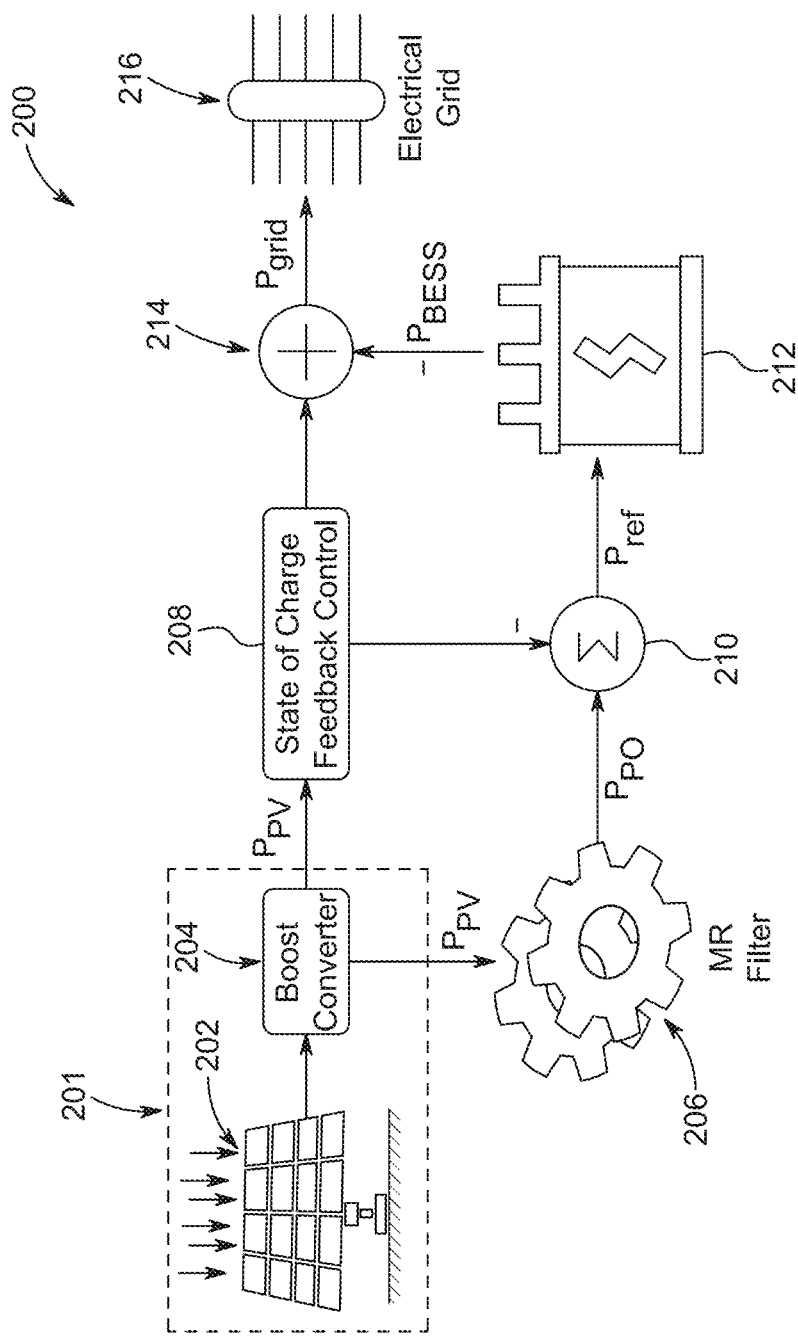
FIG. 2 illustrates a solar photovoltaic (PV) network, according to aspects of the present disclosure.

FIG. 2 illustrates a block diagram of a solar PV network 200 (hereinafter interchangeably referred to as "the network 200"), according to aspects of the present disclosure. Referring to FIG. 2, the network 200 includes a PV module 201, a moving regression (MR) filter 206, a State of Charge (SoC) feedback control 208, a summation unit 210, a Battery Energy Storage System (BESS) 212, a combiner 214, and an electrical grid 216.

The PV module 201 is configured to receive solar light signals and to generate unsmoothed solar PV power output ($P_{PV}$). To achieve a required voltage and current, a group of PV modules (also called PV panels) are wired into an array called as a PV array 202. Several PV modules 201 can be wired together in series and/or parallel to deliver voltage and current according to the system requirements. In an aspect, the PV module 201 includes the PV array 202, and a boost converter 204.

The boost converter 204 is configured to boost the power produced by the PV module 201 and transfer the boosted power to the MR filter 206, and the SoC feedback control 208. In an aspect, the boost converter 204 (for example, step-up converter) is a DC-to-DC power converter that steps up voltage (while stepping down current) from its input (supply) to its output (load).

The MR filter 206 and the SoC feedback control 208 are coupled to the PV module 201 to receive unsmoothed solar PV power output power ($P_{PV}$). The MR filter 206 is configured to reduce ripple from the received unsmoothed solar PV power output power ($P_{PV}$) and to generate a filter smooth output power ($P_{PO}$).

The MR filter 206 is a non-parametric smoother that is configured to employ at least one machine learning method to smooth out the PV variations at every time step. In an aspect, at least one machine learning method is a linear regression.

In an aspect, the MR filter 206 is coupled to circuitry (not shown) including a memory storing program instructions and at least one processor configured to perform the program instructions. In an aspect, the memory is configured to store a linear regression model and a predefined dataset for training the linear regression model. The stored program instructions include a program that implements a method for using machine-learning methods to perform linear regression on an unsmoothed power in accordance with embodiments of the present disclosure and may implement other embodiments described in this specification.

According to an aspect of the present disclosure, at least one processor may be implemented as microprocessors, microcomputers, microcontrollers, digital signal processors, central processing units, state machines, logic circuitries, and/or any devices that manipulate signals based on operational instructions. Among other capabilities, at least one processor may be configured to fetch and execute computer-readable instructions stored in the memory.

The memory may be coupled to the processor and may include any computer-readable medium known in the art including, for example, any type of disk, including floppy disk, optical disk, CD-ROM and magneto-optical disk, read only memory (ROM), random access memory (RAM), EPROM, EEPROM, magnetic or Optical card, any type of medium suitable for storing electronic instructions, but is not limited to these.

In the MR filter 206, the window size may be varied according to requirements. Based on the window size of the MR filter 206, the neighboring points k of the target value are used as the training values for a linear regression algorithm. In some examples, larger window sizes mean that more neighboring data k may be used for training the linear regression model in the MR filter 206, and therefore higher the accuracy of the predicted smoothed value. In the linear regression algorithm, priority weights may be assigned to the neighboring values based on its distance from the target value. The MR filter 206 may also use the window size as an input parameter. The MR filter 206 has exceptional power tracking capabilities even with larger window sizes compared with other filter alternatives, such as LPF, MA filter, MM filter, GF, DMA filter, GF and SG filter. Therefore, the time delay caused by the MR filter 206 is less dependent on the window size of the MR filter 206. In an aspect, the MR filter 206 assists in achieving higher degrees of PV power smoothing and power tracking, reducing time delays, and decreasing battery charging and discharging power, as compared with other filter alternatives.

The SoC feedback control 208 is configured to receive the unsmoothed solar PV power output power ($P_{PV}$) from the PV module 201. The state of charge (SoC) is a measurement of the amount of energy available in a battery at a specific point in time expressed as a percentage. For example, the SoC reading for a battery might read 85% full or 20% full. The SoC provides information of how much longer the battery can provide power/energy before it is needed to be charged or replaced. Based on the SoC, the remaining capacity of the battery can be used in a more effective and controlled manner. The SoC feedback control 208 is configured to prolong the lifetime of the battery. Over-charging and over-discharging are two of the prime causes of reducing lifetime of the battery. The SoC information is configured to determine the end of the charging and discharging cycles, thereby preventing the battery from over-charging and over-discharging and enhancing the lifetime of the battery. Further, accurate SoC information is configured to keep the battery operating within the required, safe limits. The SoC is configured to allow the battery to discharge up to a fixed level, and when the power of the battery is reached to the fixed level, the SoC is configured to prevent the battery from over-discharging by communicating SoC information to a control unit, configured to take precautionary action.

In an aspect, the MR filter 206, the SoC feedback control 208 and BESS 212 operate to reduce a power lag and a ramp rate for a PV system. In a further aspect, the MR filter 206 and the SoC feedback control 208 provide battery storage capacity optimization by managing battery charging and discharging state. In an operative aspect, the output power of the PV module 201 acts as the control signal, which is smoothed by the MR filter 206. A difference between the photovoltaic power and the smoothed photovoltaic power is compensated by charging or discharging power of the BESS 212. Further, the SoC feedback control 208 along with the MR filter 206 and the BESS 212 is configured to provide smoothing of solar PV variabilities.

As shown in FIG. 2, the output of the SoC feedback control 208 is further coupled to the summation unit 210 and the combiner 214.

The summation unit 210 is commutatively coupled to the MR filter 206 and the SoC feedback control 208 to receive the filter smooth output power ($P_{PO}$) and an output of the SoC feedback control 208, respectively. During the summation, the output received from the SoC feedback control 208 acts as negative feedback, and by applying the negative feedback stability of the signals is achieved. The summation unit 210 is configured to generate a power reference output ($P_{ref}$) by combining $P_{PO}$ and the output of the SoC feedback control 208.

The BESS 212 is coupled with the summation unit 210 and receives the power reference output ($P_{ref}$). The BESS 212 is further configured to generate a BESS power output ($P_{BESS}$).

Figure 3:
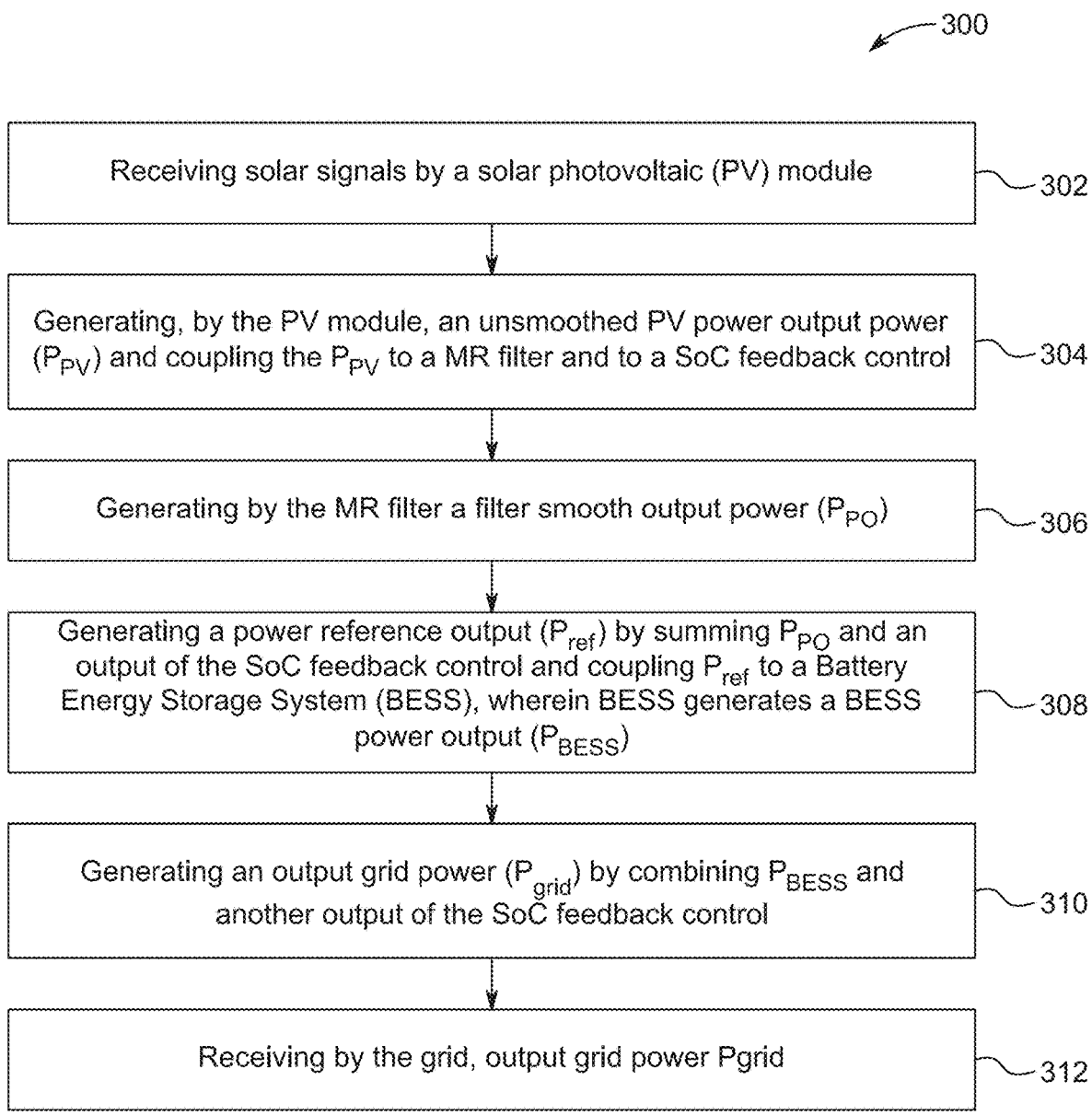
FIG. 3 illustrates a flow chart for a method for providing a solar PV power to an electrical grid, according to aspects of the present disclosure.

The combiner 214 is configured to receive the smoothed output of the SoC feedback control 208 and the BESS power output ($P_{BESS}$) from the BESS 212. In an aspect, the outputs of the SoC feedback control 208 and the BESS 212 are combined to generate a smoother solar PV power output that is coupled to the electrical grid 216. The combiner 214 is configured to generate an output grid power ($P_{grid}$) by combining $P_{BESS}$ and another output of the SoC feedback control 208. The electrical grid 216 is configured to receive the output grid power $P_{grid}$. FIG. 3 illustrates a method 300 for providing a solar PV power to the electrical grid, according to aspects of the present disclosure.

Step 302 includes receiving solar signals by a PV module 201. According to an aspect of the present disclosure, the PV module 201 comprises the PV array 202 and the boost converter 204.

Step 304 includes generating the unsmoothed solar PV power output power ($P_{PV}$) by the PV module 201 and coupling the $P_{PV}$ to the MR filter 206 and to the SoC feedback control 208. According to aspects of the present disclosure, the MR filter 206 and SoC feedback control 208 receive the unsmoothed solar PV power output from the PV module 201.

Step 306 includes generating the filter smooth output power ($P_{PO}$) by the MR filter 206. According to an aspect of the present disclosure, the MR filter 206 is a non-parametric smoother that utilizes a machine learning concept of linear regression to smooth out solar PV variations at every time step. In an aspect of the disclosure, a window size of the MR filter 206 determines training values of the linear regression. Further, a larger window size of the MR filter 206 causes a higher degree of PV power smoothing.

Step 308 includes generating the power reference output ($P_{ref}$) by summing $P_{PO}$ and an output of the SoC feedback control 208. Further, $P_{ref}$ is coupled to a Battery Energy Storage System (BESS) 212, wherein the BESS 212 generates a BESS power output ($P_{BESS}$).

Step 310 includes generating the output grid power ($P_{grid}$) by combining $P_{BESS}$ and another output of the SoC feedback control 208.

Step 312 includes receiving output grid power $P_{grid}$ by the electrical grid 216.

Low Pass Filter

Figure 4:
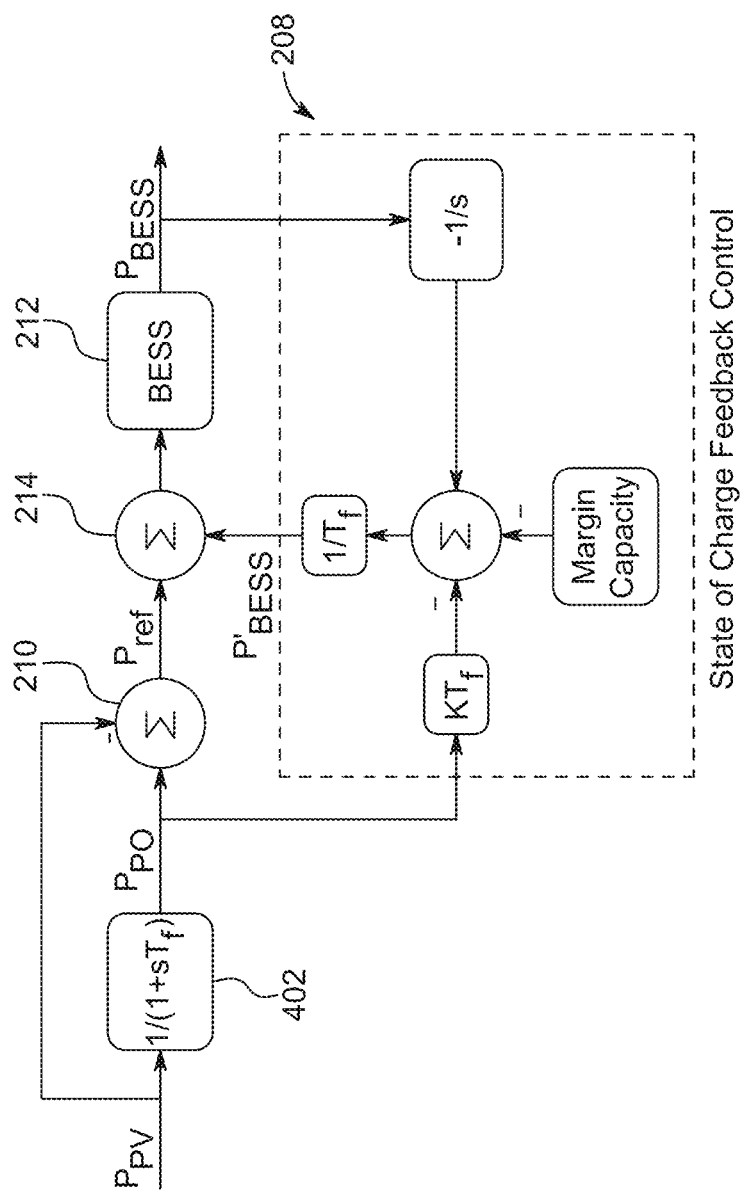
FIG. 4 illustrates a diagram of power smoothing with a State of Charge (SoC) feedback control and a low pass filter, according to aspects of the present disclosure.

A smoothing methodology employing SoC feedback control combined with a LPF is illustrated in FIG. 4. FIG. 4 illustrates a block diagram of smoothing of the unsmoothed solar PV power output $P_{PV}$ generated from a PV module (not shown) with the SoC feedback control 408 and LPF 402, according to aspects of the present disclosure.

As shown in FIG. 4, the SoC feedback control 408 is coupled with a LPF 402. The SoC feedback control 408 is configured to prolong the lifetime of the battery. The function of the LPF 402 is to block the high-frequency components while allowing the low-frequency components to pass through it. The unsmoothed solar PV power output power $P_{PV}$ functions as a control signal that should be be flattened through the low pass filter. The $P_{PV}$ represents an unsmoothed PV signal, while $P_{PO}$ represents the filter smoothed output power. Charging and discharging power signal $P_{ref}$ of the BESS 412 is the difference between the smoothed signal $P_{PO}$ and the unsmoothed signal $P_{PV}$. The output of the BESS 412 is denoted by $P_{BESS}$. The BESS 412 charges when $P_{BESS}$ is positive ($P_{BESS}>0$) and discharges ($P_{BESS}<0$) with negative $P_{BESS}$. The power to be infused into the utility network $P_{grid}$ is the summation of the $P_{BESS}$ and the PV power $P_{PV}$. The time constant ($T_f$) of the LPF 402 is selected such that the $T_f$ accounts for the solar irradiance aberrations and does not violate the ramp rate of the grid by approximately 10%. The degree of PV firming achieved is directly proportional to the $T_f$ of the LPF 402. Larger values of the $T_f$ lead to smoother power output, but at the cost of causing a significant time delay. The following equations realize a model shown in FIG. 4 that establishes the relationships governing the LPF 402 integrated with SoC feedback control 408.

The LPF 402 is based on the transfer function:

$$H(s) = \frac{1}{sT_{f+1}}, \tag{1}$$

where $T_f$=RC.

The $P_{ref}$ after the LPF filtering is as follows:

$$P_{ref}(s) = \frac{-sT_f}{sT_{f+1}} \cdot P_{PV}(s) \tag{2}$$

The battery SoC is given in equation (3), where $E_{BESS}$ is the battery capacity.

$$SoC(s) = \frac{-P_{BESS}(s)}{S \cdot E_{BESS}} \tag{3}$$

The battery SoC represents the level of charge of an electric battery relative to its capacity.

The battery thermal limitations may depend on the battery capacity. Higher capacity indicates that the PV power may be handled without violating the upper and lower battery thermal limitations. Following equation relates the battery capacity with the battery SoC and $P_{PO}$.

$$E_{BESS} = \frac{T_f \cdot P_{PO}(s)}{SoC(s)} \tag{4}$$

To overcome the issue of battery overcharging and deep discharging, a zoom coefficient K is introduced. The battery capacity is limited by setting a positive value for K. The average unsmoothed PV power is denoted by $\overline{P}_{PV}$.

$$KT_f\overline{P}_{PV} \leq E_{BESS} \tag{5}$$

The coefficient K is optimized in equation (6) using the upper and lower SoC limits denoted by $SoC_{mh}$ and $SoC_{ml}$, respectively.

$$(SoC_{mh}+SoC_{ml})\cdot E_{BESS}=(E_{BESS}-KT_f)\cdot \overline{P}_{PV} \tag{6}$$

The $E_{BESS}$ is regulated by feedback control of the battery's SoC as shown in equation (7), thus the battery output is the summation of charging/discharging power, Storage capacity margins, and the smoothed PV power.

$$P'_{BESS}\cdot T_f = SoC(s)\cdot E_{BESS} - \left(\frac{KT_f}{sT_{f+1}}\cdot P_{PV}(s)\right) - \left(E_{BESS} - KT_f\cdot \overline{P}_{PV}(s)\right) \tag{7}$$

The dispatchable grid power is given by (8), which is the summation of the PV power $P_{PV}$ and $P_{BESS}$.

$$P_{grid}(s)=P_{BESS}+P_{PV}(s) \tag{8}$$

With ($P_{BESS}<0$), the battery is being injected with power (charging) and ($P_{BESS}>0$) suggests that the battery system is providing power to the grid (discharging).

Moving Average Filter

The following is a description of the smoothing methodology of using a moving average (MA) filter in a solar PV system. The fluctuations of the PV power can be smoothed out through the use of a MA filter. The MA filter operates by calculating the average value of the recorded PV power across a sliding window. The window size of the MA filter and the real photovoltaic power data are the required inputs to an algorithm. The magnitude of the moving average window size directly determines the extent of solar power firming. The amount of flatness can be altered by adjusting the value of the filter window size. The difference between the MA smoothing algorithm power output and the real PV power data can result in the charging and discharging power of the battery. The scale of power lagging increases as the window size increases, however, it also results in a considerably smoother power output. The algorithms shown in (9) and (10) are used to model the moving average filter.

$$Y_i = \begin{cases} \dfrac{\sum_{j=0}^{M-1} S_{i+j}}{M}, & \text{if } i > 0 \text{ and } i < N - (M-1), \\ 0, & \text{otherwise} \end{cases} \tag{9}$$

$$Y_i = \begin{cases} \dfrac{\sum_{\frac{-(M-1)}{2}}^{\frac{(M-1)}{2}} S_{i+j}}{M}, & \text{if } i > \dfrac{(M-1)}{2} \text{ and } i < N - \dfrac{(M+1)}{2}, \\ 0, & \text{otherwise} \end{cases} \tag{10}$$

where the total number of data points is represented by N. Whereas M denotes the mean across a specified time interval. The input for the MA algorithm is presented by $S_{i+j}$ and the result of the algorithm is symbolized by $Y_i$. Equation (10) is utilized when the number of data points to be used by the MA algorithm is odd.

Double Moving Average Filter

Figure 5:
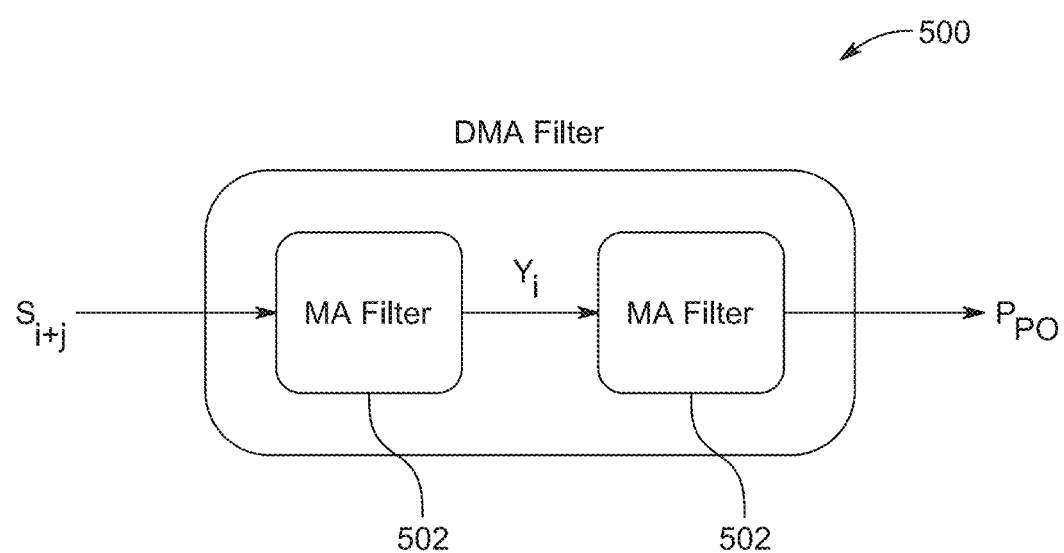
FIG. 5 represents a double moving average filter logic scheme, according to aspects of the present disclosure.

Another methodology for solar power smoothing is based on using a double moving average filter (DMA). FIG. 5 represents the double moving average (DMA) filter 500, according to aspects of the present disclosure. The DMA filter 500 can be established by merging two MA filters 502 in sequence. The block diagram shown in FIG. 5 demonstrates the construction of a DMA filter 500. Thus, the DMA filter 500 includes two window sizes, one for each MA filter 502. The DMA filter 500 involves moving average calculation of the data using a first MA filter, and then a second MA filter computes using the averages from the first moving average as observations.

The DMA filter 500 has a most suitable smoothing, power tracking, battery state of charge management, and charging/discharging power performance when both the window sizes of the DMA filter 500 are chosen to be equal. As compared to the MA filter 206, the DMA filter 500 has an improved overall performance neglecting the cost of implementation. Mathematically, by doubling the equations (9) and (10), the DMA filter 500 may be realized. As per equations (9) and (10), the output of the first MA filter $Y_i$ is considered as an input to the second MA filter as shown in FIG. 5.

Equations (9) and (10), as previously noted, are used to model the MA filter 502

$Y_i$=Moving Median Filter

The moving median (MM) filter also employs a window of a fixed length for power smoothing. However, instead of calculating the average across the window, the MM filter computes a median value of a vector of length given by window size. The MM filter is beneficial over the averaging algorithms as the short term and expeditious instabilities can be minimized. The MM filter is highly efficient when there are additional outliers in the enclosed data. That is, if the output solar power dataset within the specified window consists of numerous outlying data points, then the MM filter will more efficiently handle this data in contrast to the averaging MA and DMA filters. When there are not enough elements for the window, the window size is automatically shortened. Nonetheless, the MM filter is a non-separable filter, and the MM filter also results in less levelness for window sizes like the ones used in the MA or DMA filtering techniques. The MM filter is used in existing studies for solar output power smoothing and assesses its performance against the LPF and the MA filter.

The median value y(n) is acquired over the slide window across its neighboring values as:

$$Y(n)=f(x(n)),x(n-1), \ldots x(n-m),(n-1),y(n-2), \ldots y(n-m), \quad (11)$$

$$x(n)=[x(n)),x(n-1), \ldots x(n-m)]^T, \quad (12)$$

For the given vector x(n), the result Y(n) represents the middle value of the vector.

$$y(n)=\text{med}\{x(i)\},i=n,n-1,n-m. \quad (13)$$

When the window size is chosen to be odd, the window is positioned around the element in the current position. In case of even a window size, the window is placed around the previous and current data points. However, for higher-dimensional data the specified window may incorporate all the entries inside the ellipsoidal region.

Savitsky-Golay Filter

In contrast to the MA filter which uses the averaging algorithms mentioned in equations (9) and (10), a Savitsky-Golay (SG) filter utilizes the technique of least square of polynomial fitting over a sliding window. Therefore, the SG filter is also called a least squares polynomial filter. The filter coefficients may be obtained through an unweighted linear least square fit employing a polynomial of a given degree. A key advantage that the SG filter has against the MA filter is that the SG filter manages to pertain the main features of the data such as the height, width and peak of the signal which otherwise is weakened by the MA filter. Also, the MA filter tends to filter out a substantial amount of the signal's high frequency components and conserves the lesser moments of the peak. The overall performance of the SG filter may tend to improve as the polynomial order of the filter is increased. That is, at higher orders, it is possible to achieve a high level of smoothing without attenuating the data features. However, the SG filter may be less effective at rejecting noise as compared to the MA filter and the SG filter may have odd numbers for window sizes. Additionally, the SG filter may be implemented for the purpose of photovoltaic power smoothing.

Applying the SG filter to a set of data given as follows $$y(n)=x(n)+w(n), \quad (14)$$

where x(n) is an estimated time series data, and w(n) is a noise signal on y(n).

$$\hat{x}(n) = \sum_{k=-M}^{M} h(n)y(n-k), \quad (15)$$

where M denotes the SG filter parameter, h(n) is the impulse response of the filter over ($|n|\leq M$). The coefficient of polynomial k that best suits y(n) over ($|n|\leq M$) is defined as $\hat{x}(n)$ at (n=0). The requirement (0<k≤2M) for the polynomial order k should be met due to the symmetric nature of the impulse response at (n=0). Consequently, the impulse response h(n) is associated with the transfer function of the SG filter as follows:

$$H(z)=\Sigma_n h(n)z^{-n}. \quad (16)$$

The error between smoothed and the unsmoothed signal is calculated using the squared error formula as given in equation (17).

$$E = \sum_{n=-M}^{M} (y(n) - p(n))^2. \quad (17)$$

where p(n) denotes the polynomial in (18).

$$p(n)=\Sigma_{k=0}C_k n^k. \quad (18)$$

Gaussian Filter

The Gaussian filter (GF) is a smoothing filter whose impulse response is an approximation of the Gaussian function shown in equation (19).

$$f(x) = a \cdot \exp\left(\frac{-(x-b)^2}{2c^2}\right). \quad (19)$$

where a is the curve peak height, b is the center peak position, and c is the standard deviation or the Gaussian root mean square width.

The GF has no overshooting properties while minimizing a rise and fall time which results in least feasible group delay. In many existing solutions, the GF smoothing is used to firm the generation of renewable energy sources. It also demonstrates the Gaussian filter's ability in decreasing the drawbacks of the MA filter such as inadequate smoothing and power tracking. Similar to the MA filter, the GF uses a sliding window, but the degree of smoothing is determined by the standard deviation of the gaussian instead of an averaging algorithm. The GF results in a bell-shaped distribution. Subsequently, the GF occasionally tends to oversmooth the PV data resulting in the loss of the signal's characteristics.

In one dimensional, the GF can be realized as follows:

$$G(x, \sigma) = \frac{1}{\sqrt{2\pi}} \exp\left(\frac{-x^2}{2\sigma^2}\right), \quad (20)$$

where σ represents the standard deviation of the GF.

Moving Regression Filter

The MR filter 206 is a non-parametric smoother that utilizes the machine learning concept of linear regression to smooth out the PV variations at every time step. Based on the window size of the MR filter, the neighboring points k of the target value are used as the training values for the linear regression algorithm. Hence, larger window sizes mean that more neighboring data k will be used for training the linear regression model in the MR filter and hence higher the accuracy of the predicted smoothed value. Priority weights are assigned to the neighboring values based on its distance from the target value. Similar to the moving average and median filters, the MR filter also uses the window size as its input parameter. However, the MR filter has exceptional power tracking capabilities even with larger window sizes. That is, the time delay caused is less dependent on the window size for a MR filter.

A Tri-cubic function is used for calculating the distance weights w(x) for each k neighbors of x according to its distance x':

$$w(x) = \begin{cases} (1-|x|^3)^3, & |x| < 1 \\ 0, & |x| \geq 1 \end{cases}. \quad (21)$$

Normalizing equation (21) so that larger distances are associated with lower weights:

$$w(x) = \begin{cases} \left(1 - \left|\frac{d(x, x')}{\max_i d(x_i, x')}\right|^3\right)^3, & |x| < 1, x_i \in D \\ 0, & |x| \geq 1 \end{cases}, \quad (22)$$

where d(x,x') is the distance between one of the nearest neighbors k and x'. Locality is achieved by assigning higher priority to data closest to x', and the data point farthest from x' is given the lowest priority. Hence, points corresponding to a maximum distance from x' will have zero weight, whereas the point closest to x' will have the maximum possible weight of one.

A local regression model uses a weighted first-degree linear regression method to calculate the corresponding output estimate y' by using the sampled values of x and y as inputs to the local regression algorithm.

$$\beta = (X^T W X)^{-1} X^T W Y, \quad (23)$$

where β is the vector of linear parameters, W is the matrix with all the calculated weights, X and Y are the matrices containing all x and y observations, respectively.

The X matrix with n dimensions and m observations:

$$X = \begin{bmatrix} 1 & x_1^{(1)} & x_2^{(1)} & \cdots & x_{n-1}^{(1)} \\ 1 & x_1^{(2)} & x_2^{(2)} & \cdots & x_{n-1}^{(2)} \\ \cdots & \cdots & \cdots & \cdots & \cdots \\ 1 & x_1^{(m)} & x_2^{(m)} & \cdots & x_{n-1}^{(m)} \end{bmatrix}. \quad (24)$$

Similarly, the Y matrix with n dimensions and m observations:

$$y = \begin{bmatrix} 1 & y_1^{(1)} & y_2^{(1)} & \cdots & y_{n-1}^{(1)} \\ 1 & y_1^{(2)} & y_2^{(2)} & \cdots & y_{n-1}^{(2)} \\ \cdots & \cdots & \cdots & \cdots & \cdots \\ 1 & y_1^{(m)} & y_2^{(m)} & \cdots & y_{n-1}^{(m)} \end{bmatrix}. \quad (25)$$

The new values of y for smoother solar PV output are calculated by using the following equation:

$$y' = \beta^T X, \quad (26)$$

where $\beta^T$ is the transpose matrix of equation (23).

Experimental Data and Analysis

The following examples of experimental data and analysis are provided to illustrate further and to facilitate the understanding of the present disclosure.

To examine the performance, according to aspects of the present disclosure, of the proposed filtering methodology with the BESS, a real solar PV profile was imported to MATLAB for carrying out the required simulations. A performance-based comparison among the MR filters with varying window sizes, followed by MR filters assessment against the LPF, MA, MM, DMA, GF and SG filters were conducted.

A comparison of the proposed methodology with other existing smoothing techniques is performed to examine various parameters such as solar power smoothing execution of the MR filter, battery charging/discharging power, and SoC management capabilities. Additionally, an assessment of the battery ramp rate before and after filtering is also observed to further examine the performance of the proposed technique with the existing techniques.

Figure 6:
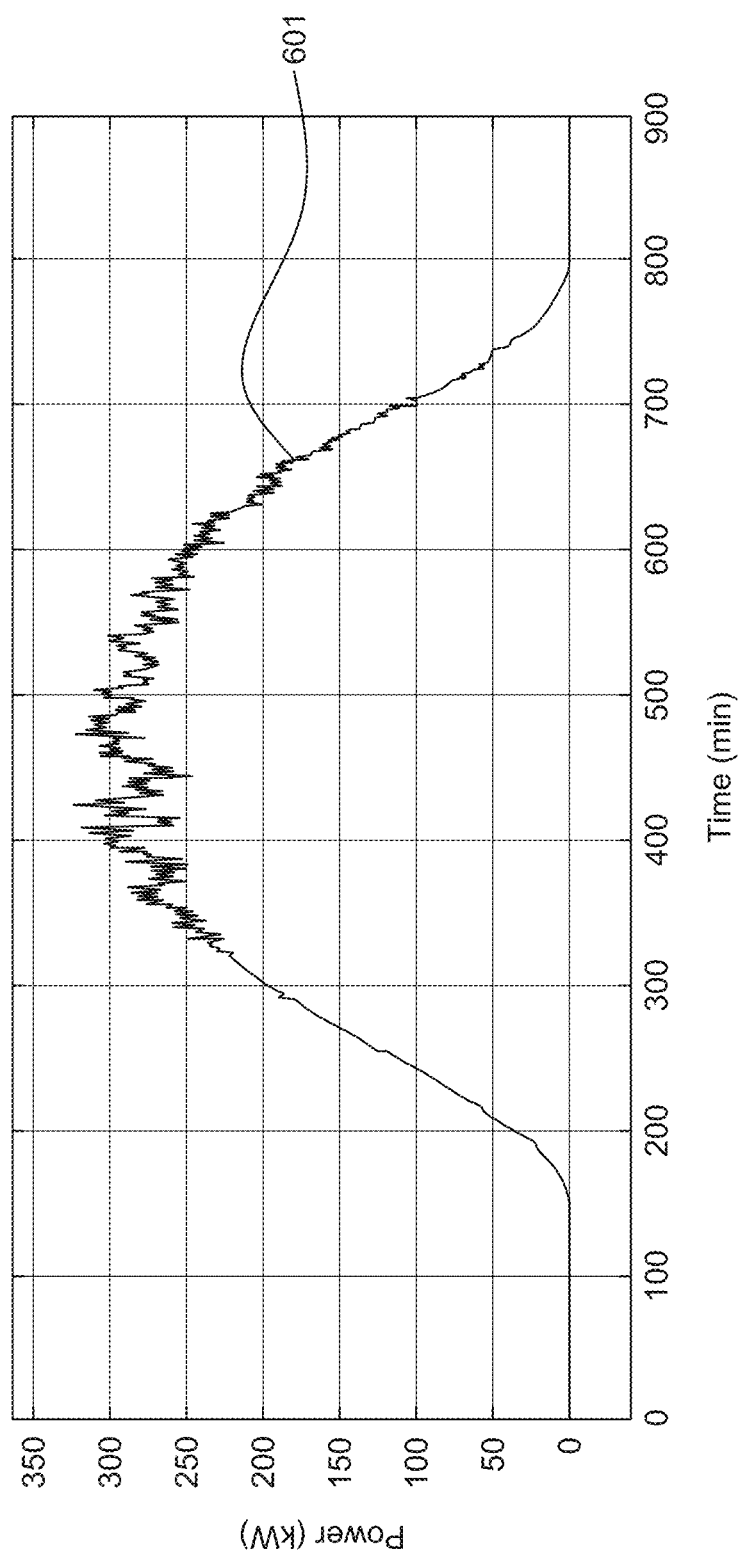
FIG. 6 represents recorded data corresponding to solar power, according to aspects of the present disclosure.

The experimental results of various filters for power smoothening is described below:

FIG. 6 represents a recorded data corresponding to solar power. In FIG. 6, signal 601 indicates the PV power generated by the PV module.

Figure 7A:
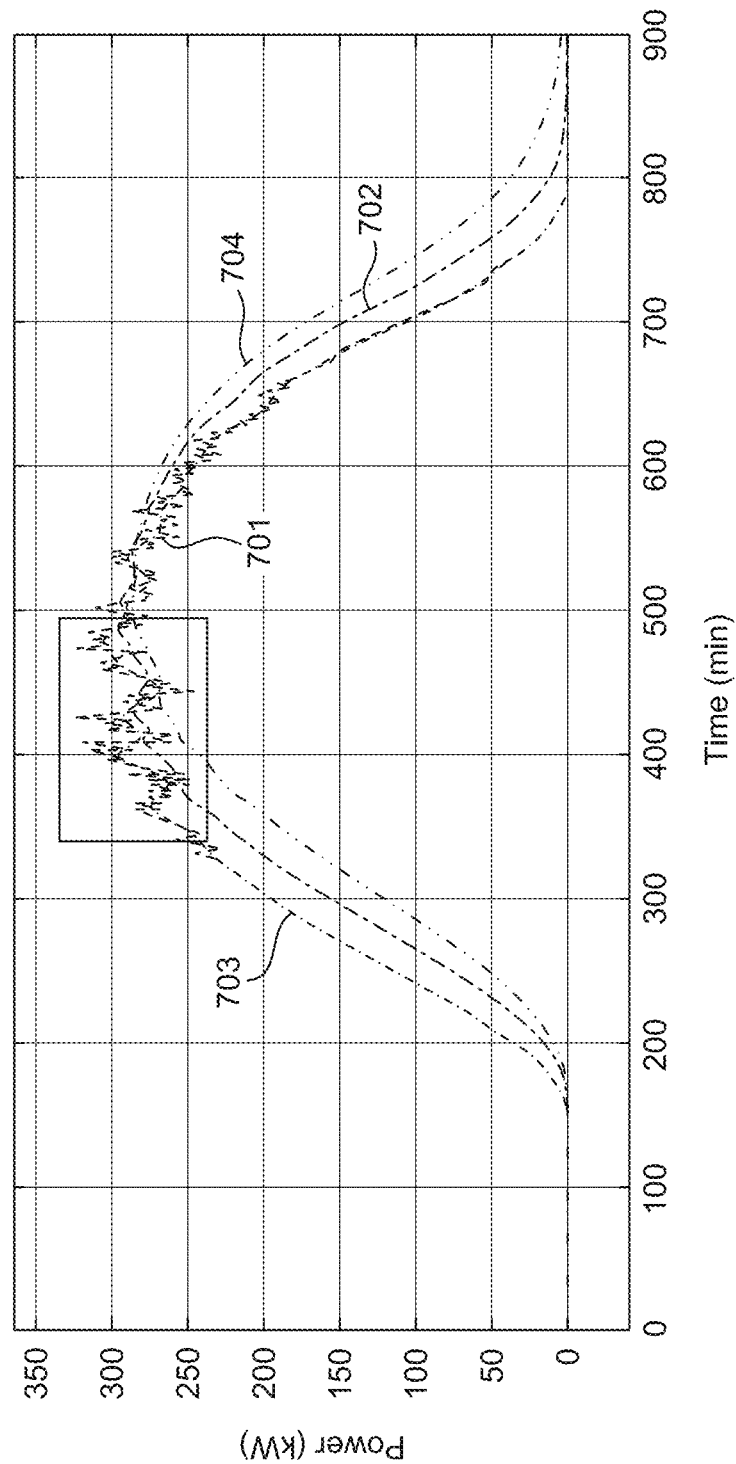
FIG. 7A represents the PV power smoothing using a Low Pass Filter (LPF) with time constants 24 and 48 minutes, according to aspects of the present disclosure.
Figure 7B:
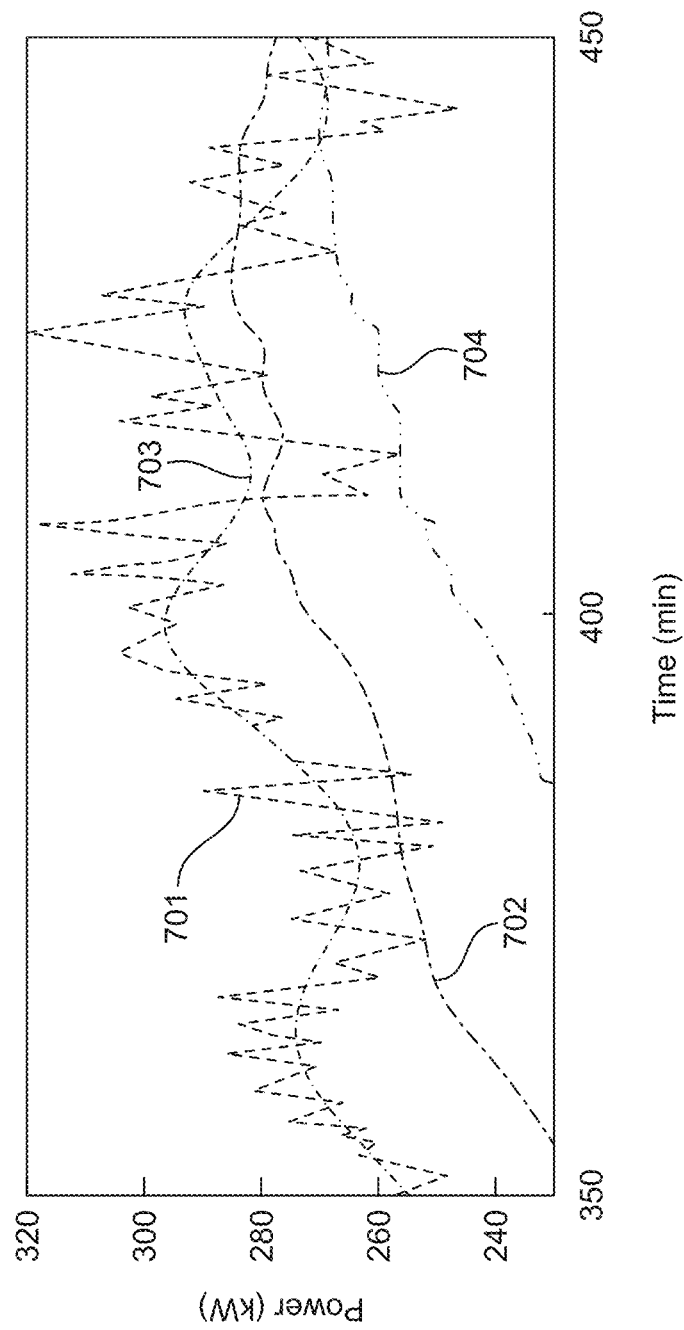
FIG. 7B is an enlarged view of the representation of FIG. 7A, according to aspects of the present disclosure.

FIG. 7A represents a PV power smoothing using a LPF with time constants (T.C) 24 and 48 minutes, according to aspects of the present disclosure. FIG. 7B is an enlarged view of the representation of FIG. 7A. As shown in FIG. 7A and FIG. 7B, signal 701 indicates the PV power. It is evident from FIG. 7A that the value of the LPF time constant affects both the degree of smoothing and power tracking of the output power. The LPF (T.C=24 mins) (signal 703) has better power tracking than LPF (T.C=48 mins) (signal 704) but it has a poorer smoothing capability than LPF (T.C=48 mins) (signal 704). Consequently, the LPF (T.C=48 mins) (signal 704) has better smoothing performance but at the cost of severe power lagging. This indicates that larger time constants result in better smoothing with increased time delay. The firming performance of the proposed MR filter (signal 702) with a window size of 45 minutes is also shown in FIG. 7A and FIG. 7B. Although the window size of the MR filter is greater than the time constant value of LPF (T.C=24 mins) (signal 703), it still manages to produce a significantly smoother power output with excellent power tracking. Also, in comparison to the LPF (T.C=48 mins) (signal 704) which has a size similar to MR (W.S=45) (signal 702), the MR filter still has both better power firming and tracking abilities.

Figure 8A:
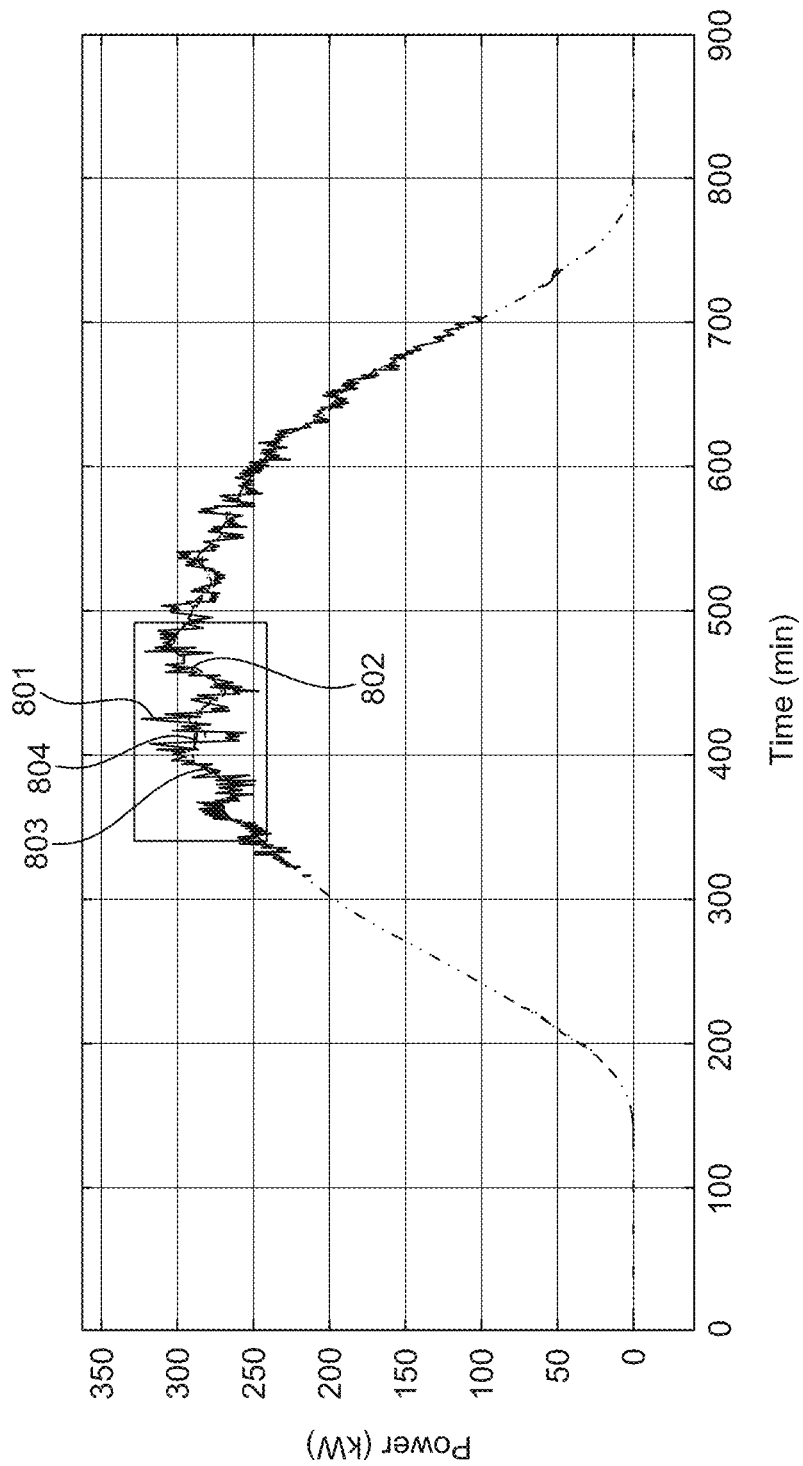
FIG. 8A represents a smoothing performance of a moving regression (MR) filter with different window sizes, according to aspects of the present disclosure.
Figure 8B:
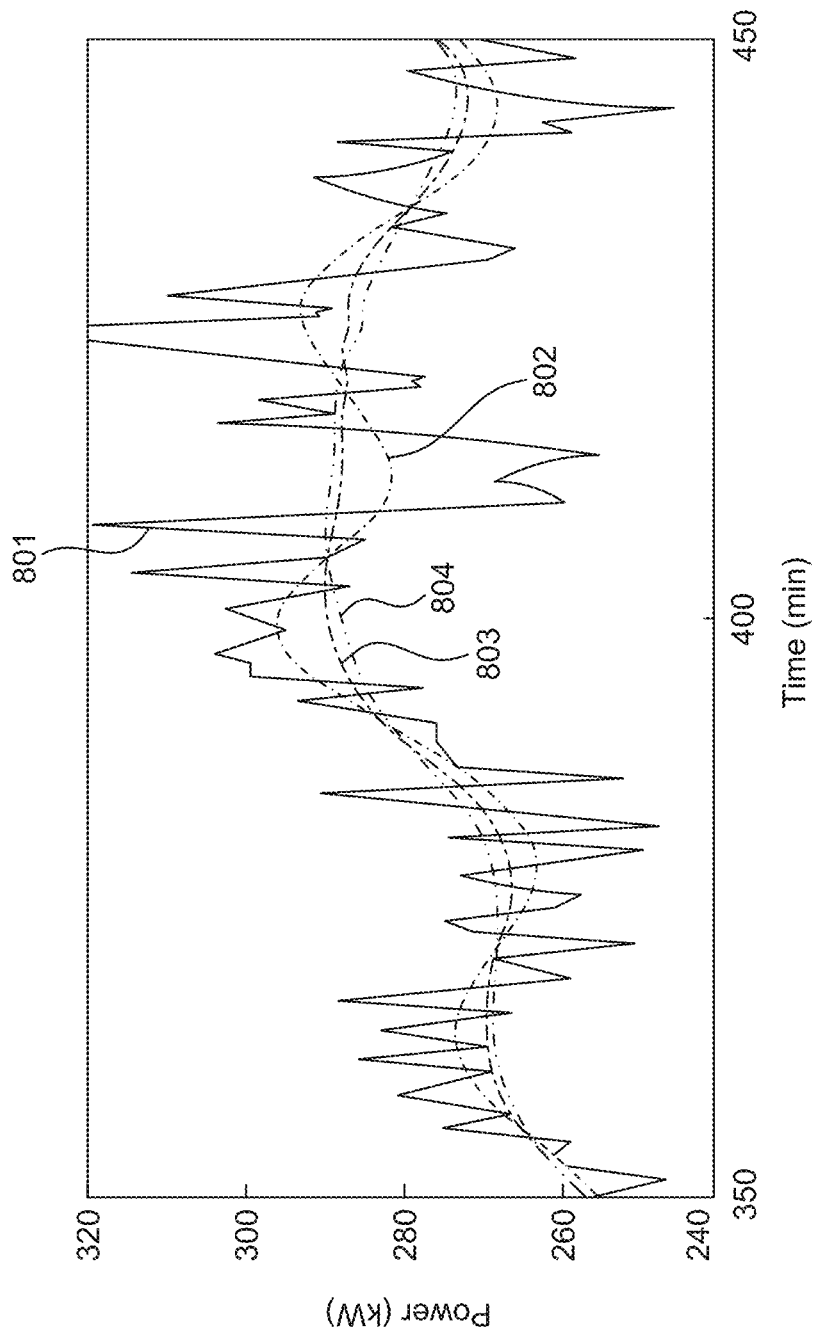
FIG. 8B is an enlarged view of the representation of FIG. 8A, according to aspects of the present disclosure.

FIG. 8A represents a smoothing performance of the MR filter with different window sizes, according to aspects of the present disclosure. FIG. 8B is an enlarged view of the representation of FIG. 8A. As shown in FIG. 8A and FIG. 8B, signal 801 indicates the PV output generated by the PV module. It can be noted from FIGS. 8A and 8B the smoothing performance of the MR filter is less affected by the increase in window size, as illustrated by signal 802 (window size=45), signal 803 (window size=63), and signal 804 (window size (W.S)=72). The MR filter with increasing window sizes however causes a slight time delay in the output power. But, in comparison to the time delay caused by the LPF filter as in FIG. 7A and FIG. 7B, it is far greater than the MR filter time delay. Also, the MR filter with a higher window size than the LPF has a significantly better overall power flattening and trailing performance.

Figure 9:
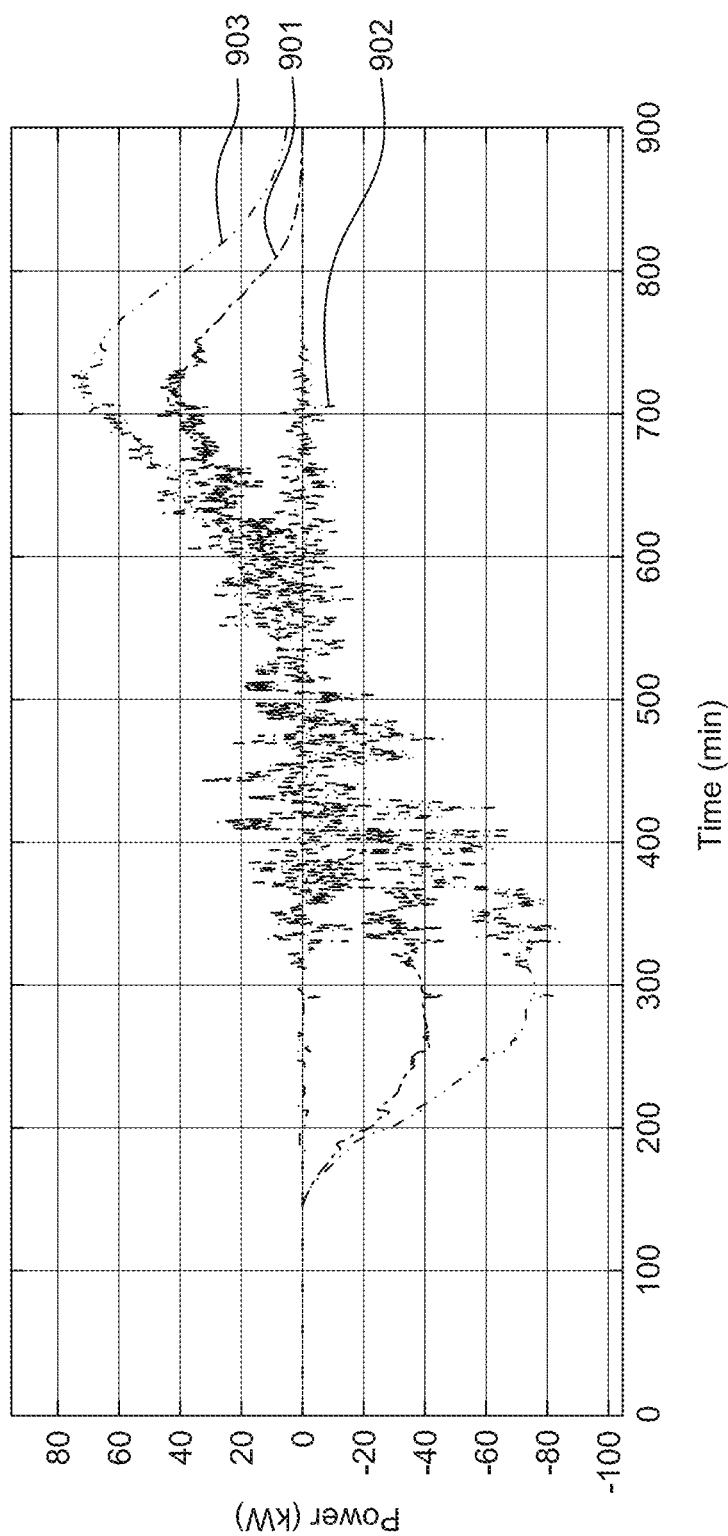
FIG. 9 represents a comparison of the LPF against the MR filter based on charging/discharging power, according to aspects of the present disclosure.

FIG. 9 represents a comparison of the LPF against the MR filter based on charging/discharging power. The time delays result in higher charging and discharging power of the battery, as validated from the battery charging and discharging power performance shown in FIG. 9. The LPF (T.C=48 mins) (as shown by signal 903) has a considerably higher charging/discharging battery than LPF (T.C=24 mins) (shown by signal 901) which is a direct result of the time delay caused. Additionally, it can also be observed from FIG. 9 that the MR filter (W.S=45) (signal 902) has drastically reduced the battery charging/discharging power even with a substantially larger window size.

Figure 10:
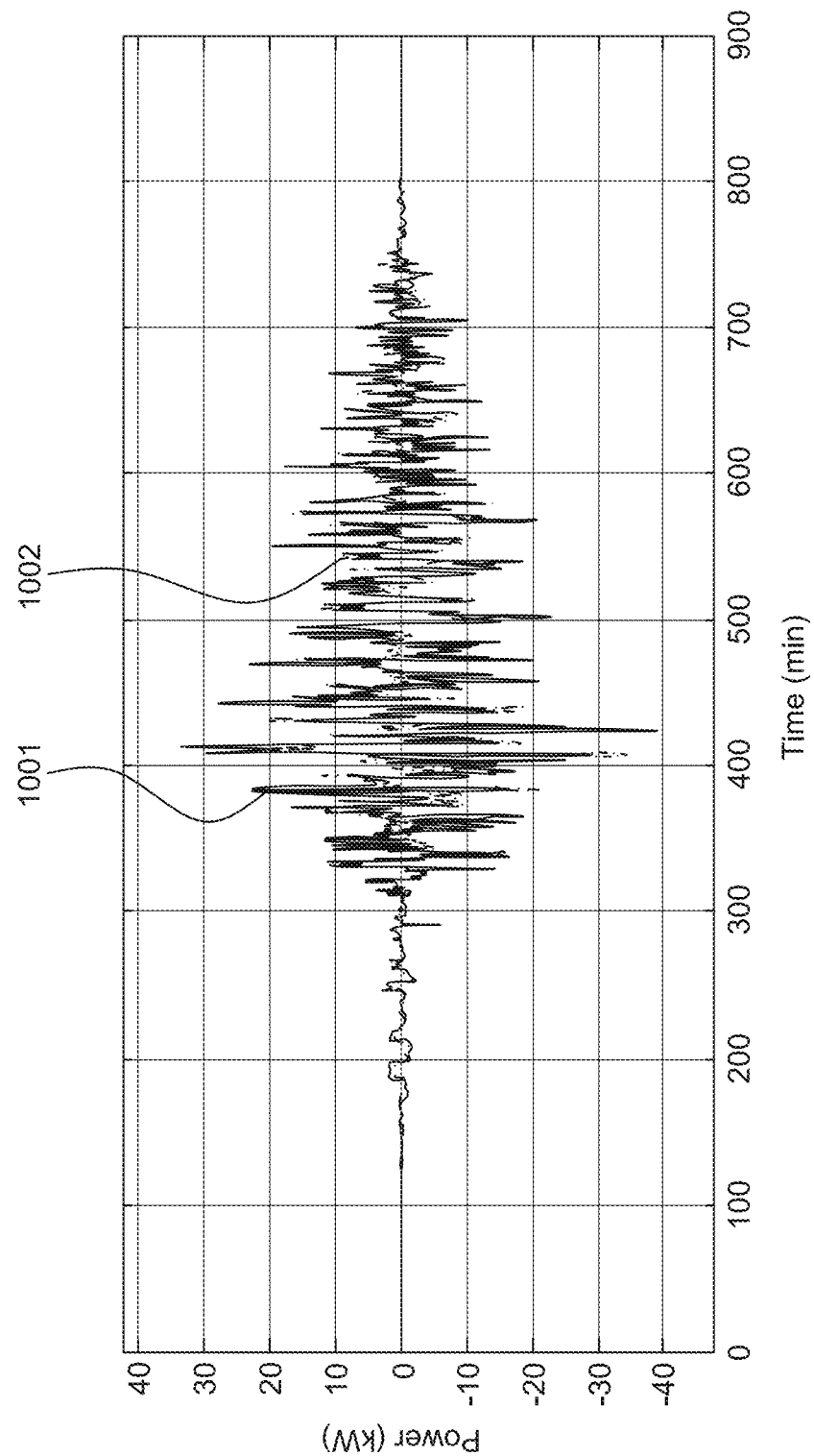
FIG. 10 represents a battery charging/discharging power performance comparison of the MR filter with different window sizes, according to aspects of the present disclosure.

FIG. 10 represents a battery charging/discharging power performance comparison of the MR filter with different window sizes (as shown by signals 1001, and 1002). As shown in FIG. 10, the increase in the window size of the MR filter increases the battery charging/discharging power but the increase is much lower as compared to the LPF's effect on the battery. Higher charging and discharging power of the battery means that larger batteries will be required and having large batteries is economically unfeasible. Thus, using the MR filter is a better solution than the LPF for optimizing the battery size while simultaneously achieving higher degrees of the PV power smoothing.

Figure 11:
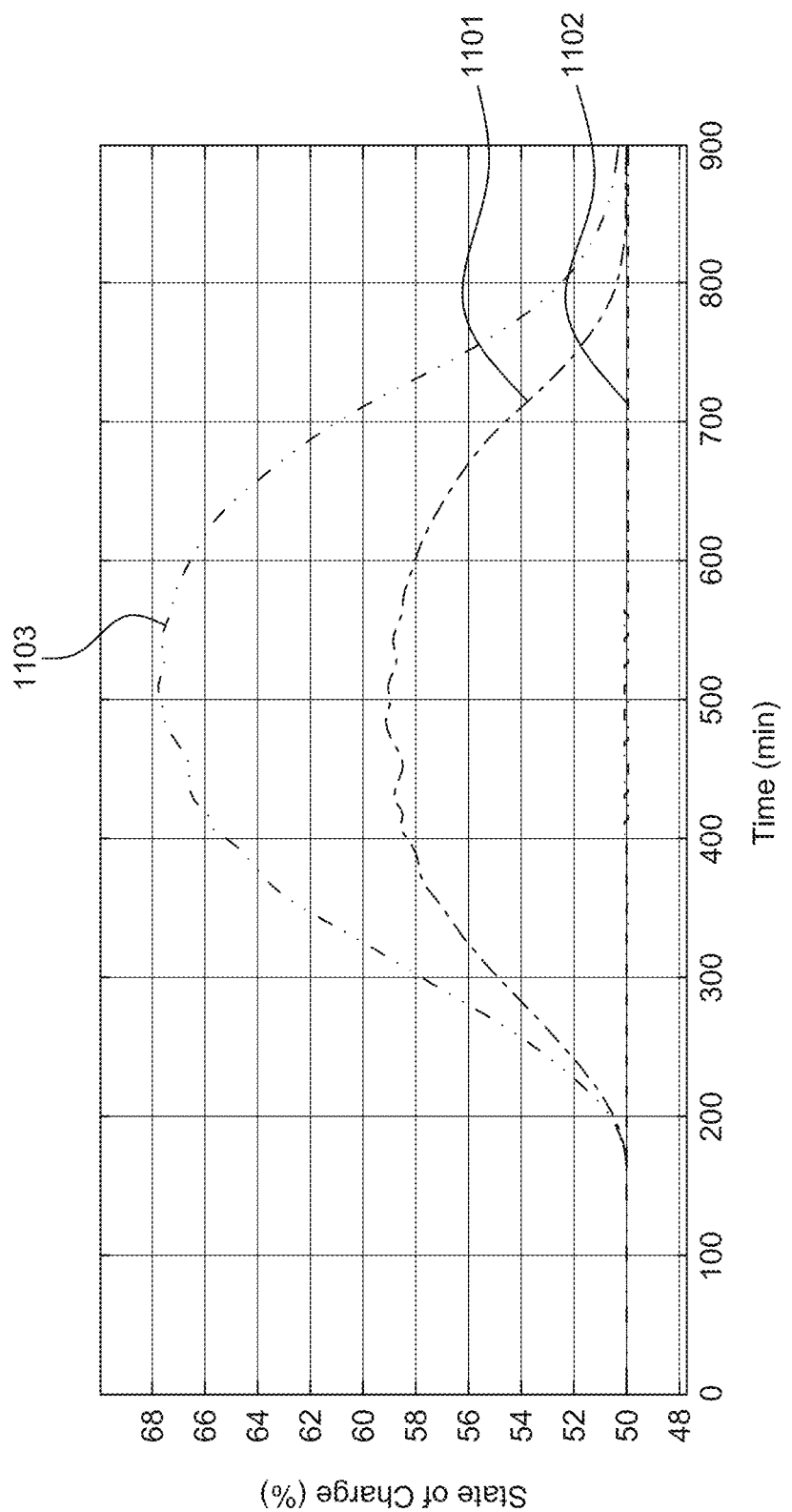
FIG. 11 represents a battery SoC comparison of the LPF against the MR filter, according to aspects of the present disclosure.

FIG. 11 represents a battery State of Charge (SoC) comparison of the LPF against the MR filter. Finally, the effect of time delay on the battery state of charge by the LPF filter is shown in FIG. 11. It is clearly shown that the time delay caused due to the LPF having higher LPF time constants (signals 1101, and 1103) greatly affects the battery SoC and to get better smoothing performance more charging and discharging rates are the result. It is also noticeable from FIG. 11 that the MR filter has the most proper battery SoC management (as illustrated by signal 1102) even with a relatively large window size of 45 minutes.

Figure 12:
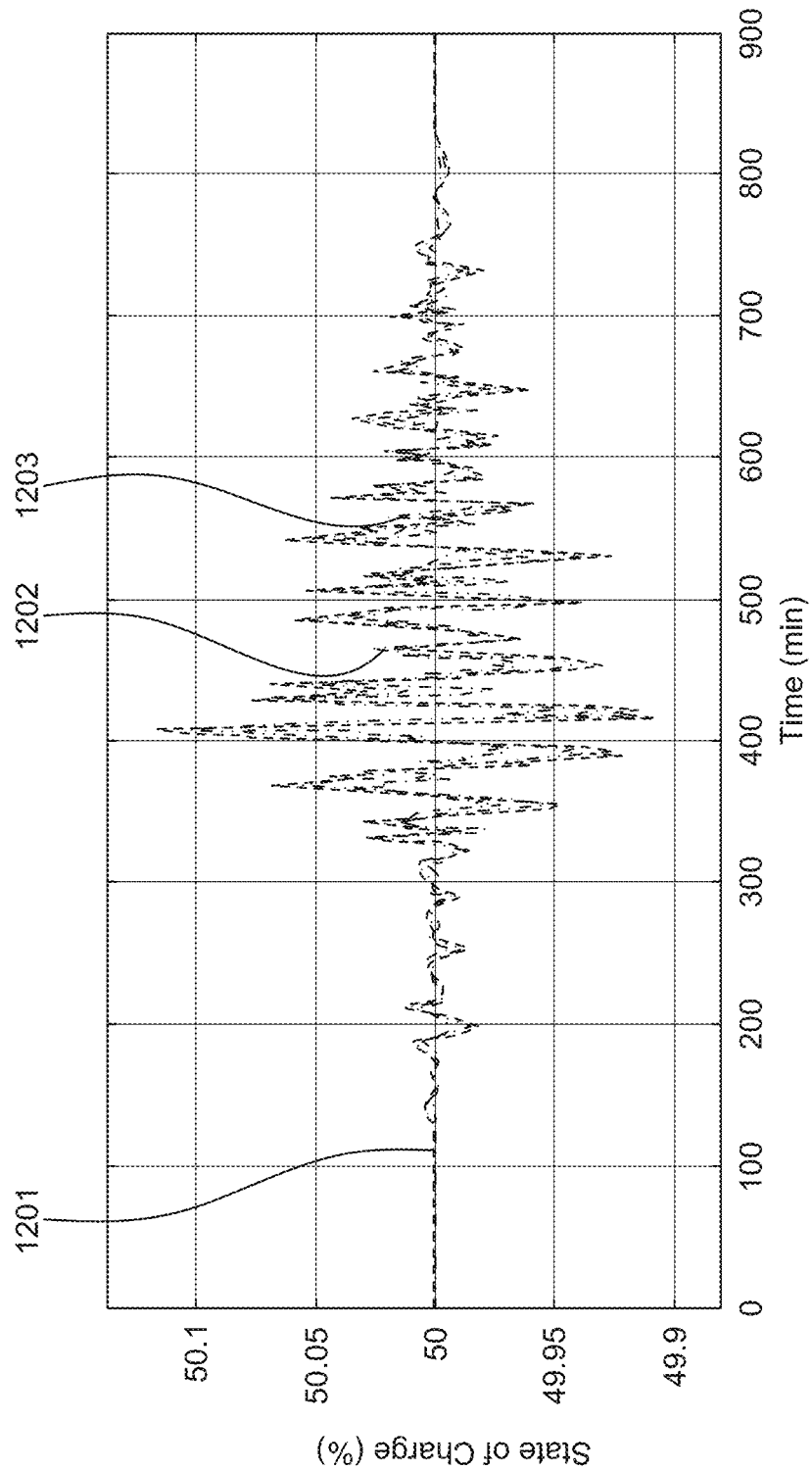
FIG. 12 represents a battery SoC performance comparison of the MR filter with different window sizes, according to aspects of the present disclosure.

FIG. 12 represents a battery SoC performance comparison of the MR filter with different window sizes (as shown by signals 1201, 1202, and 1203), according to aspects of the present disclosure. The increase in window size for the MR filter has relatively (in comparison to LPFs) lower impact on the SoC performance as demonstrated in FIG. 12. The LPF (T.C=48 mins) (signal 1103) reaches a maximum value of approximately 68% SoC (in FIG. 11), whereas the MR filter (W.S=45) with a larger window has a maximum SoC of approximately 50.1% (in FIG. 12) (as shown by signal 1203) while achieving a higher degree of solar power smoothing with the least time delay. Signal 1201 shows the battery SoC performance of the MR filter (W.S=72), whereas Signal 1202 shows the battery SoC performance of the MR filter (W.S=60). Overcharging and deep discharging of the battery affects the battery lifetime, and thus by employing an LPF filter the battery lifetime will potentially be reduced greatly. The MR filter aims to increase the battery lifetime.

Figure 13A:
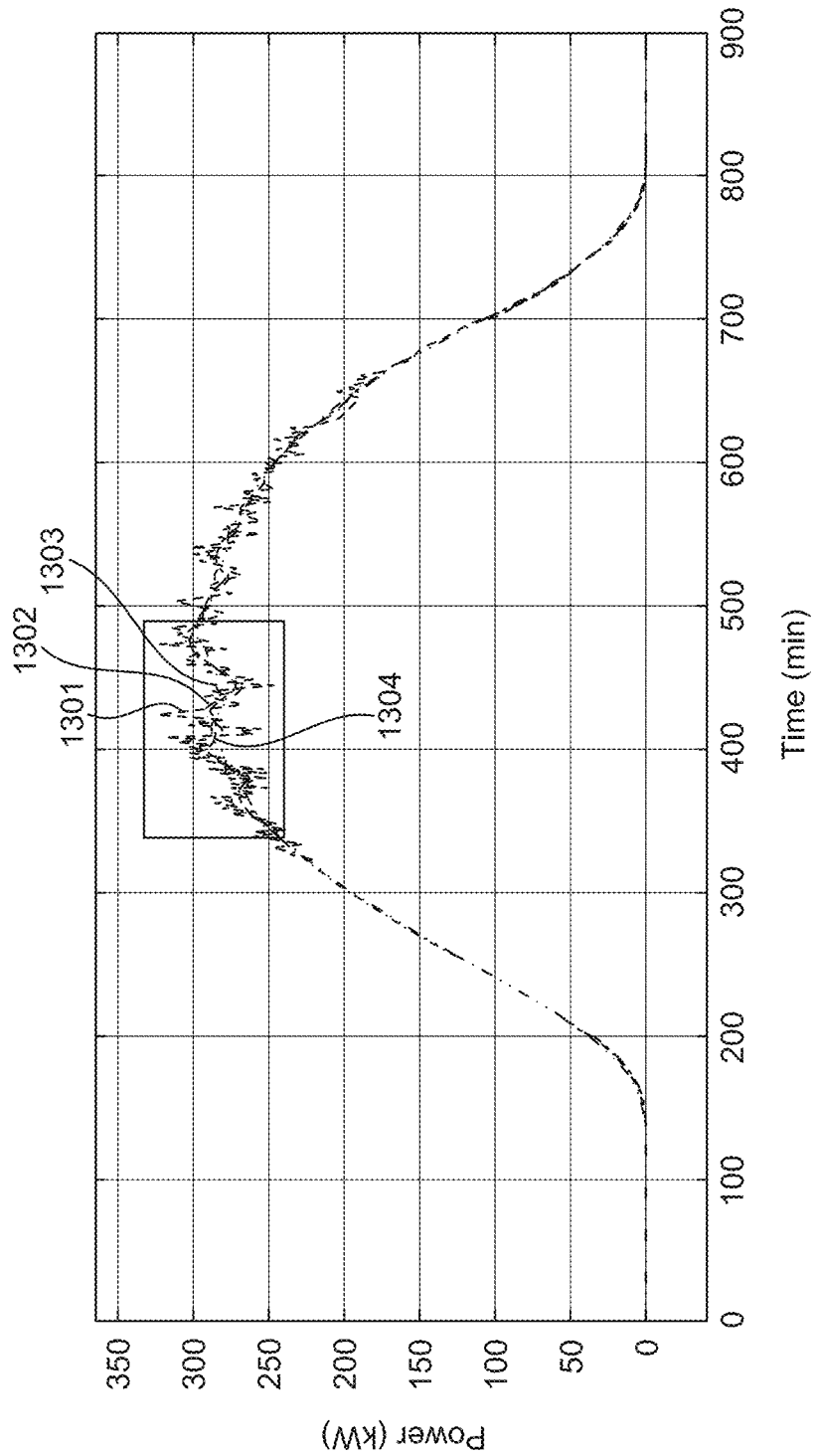
FIG. 13A represents a comparison of smoothing performance of a Moving Average (MA) filter against the MR filter, according to aspects of the present disclosure.
Figure 13B:
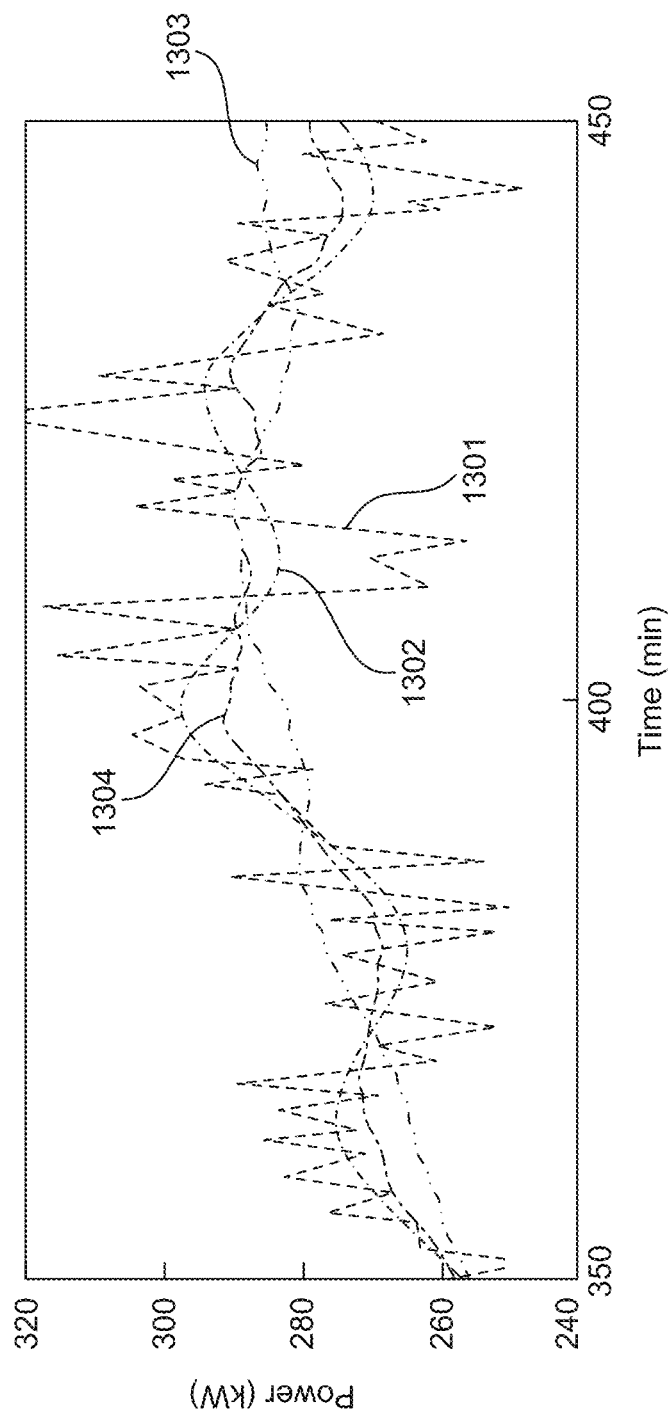
FIG. 13B is an enlarged view of the representation of FIG. 13A, according to aspects of the present disclosure.

FIG. 13A represents a comparison of the PV smoothing performance of the MA filter (as displayed by signals 1303 and 1304) against the MR filter (shown by signal 1302). Further, FIG. 13B is an enlarged view of the representation of FIG. 13A. As shown in FIG. 13A and FIG. 13B, signal 1301 indicates the PV output generated by the PV module. It can be observed that the MA filter also suffers from poor power tracking as the window size is increased. The MA with W.S=48 (signal 1303) has better smoothing performance than the MA (W.S=24) (signal 1304) but relatively worse power tracking ability. From FIG. 13A and FIG. 13B, it is evident that the MR filter (shown by signal 1302) outperforms both the MA filters in terms of power firming and tracking competencies.

Figure 14:
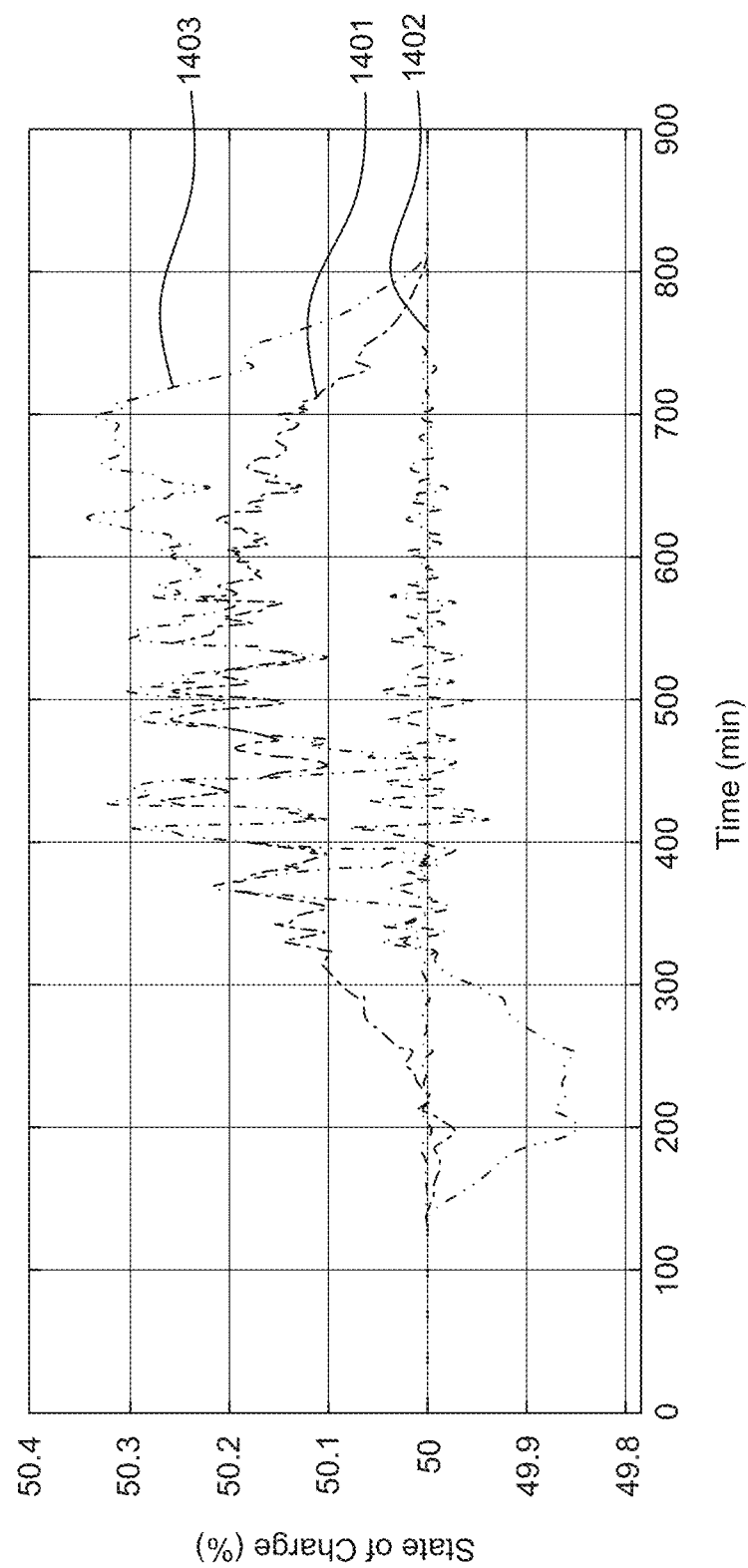
FIG. 14 represents a battery SoC comparison of the MA filter against the MR filter, according to aspects of the present disclosure.

FIG. 14 represents a battery SoC comparison of the MA filter against the MR filter. Although both the MA filters (shown in FIG. 14) (as displayed by signals 1401 and 1403) have poor SoC management performance, and the MA filter (W.S=48) (as shown by signal 1403) tends to deeply discharge the battery. This indicates that the battery life will greatly be reduced through the implementation of the MR filter. On the other hand, it can also be noted from FIG. 14 that the MR (W.S=45) (signal 1402) has proper SoC management while having a larger window size.

Figure 15:
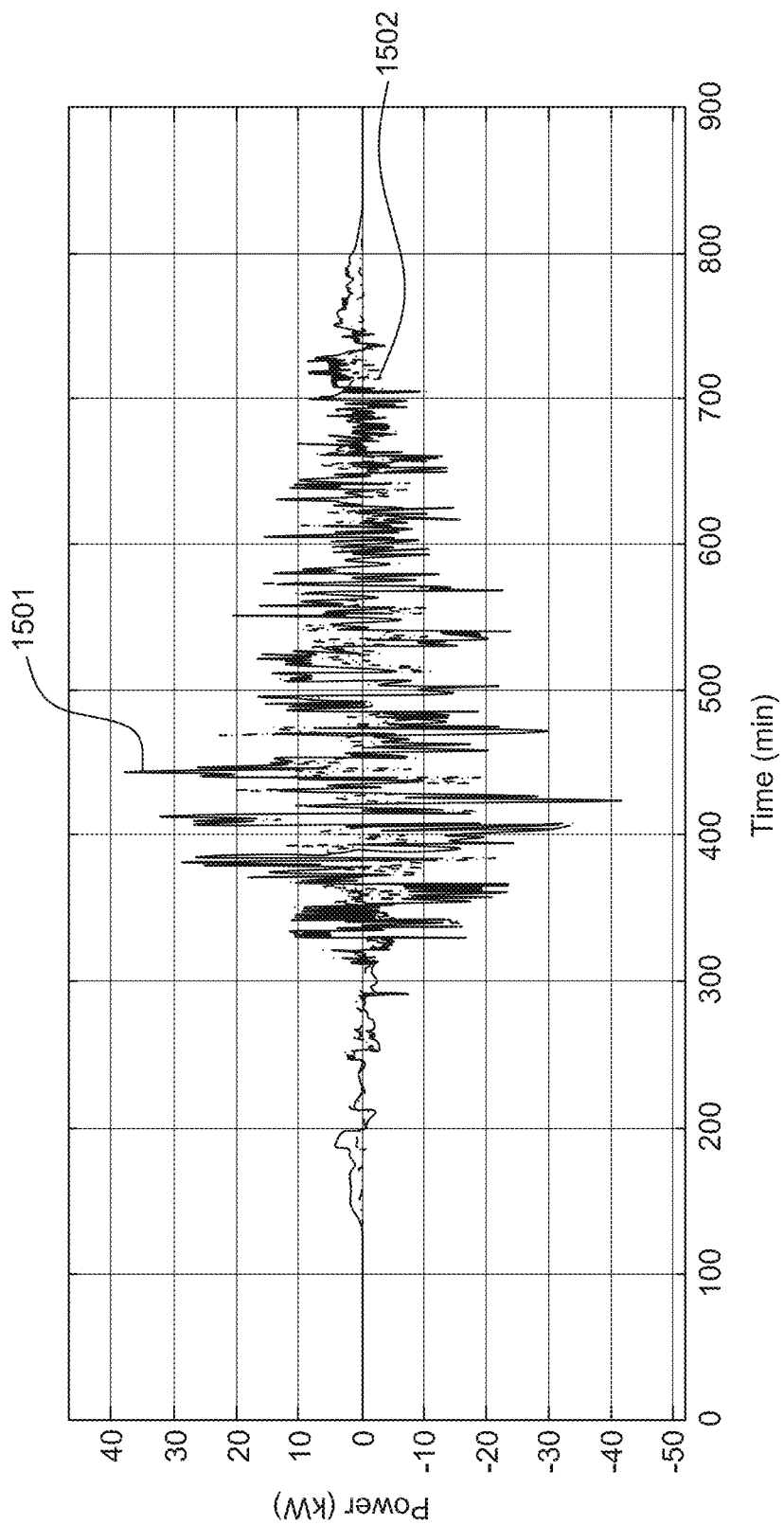
FIG. 15 represents a battery charging/discharging power performance comparison of the MA filter against the MR filter, according to aspects of the present disclosure.

FIG. 15 represents a battery charging/discharging power performance comparison of the MA filter (signal 1502) against the MR filter (signal 1501). From FIG. 15 it can also be remarked that the MR filter (W.S=45) (signal 1501) has a lower charging and discharging power than the MA (W.S=48) (signal 1502). Thus, the MR filter improves the overall performance of the battery in contrast to the MA filter.

Figure 16A:
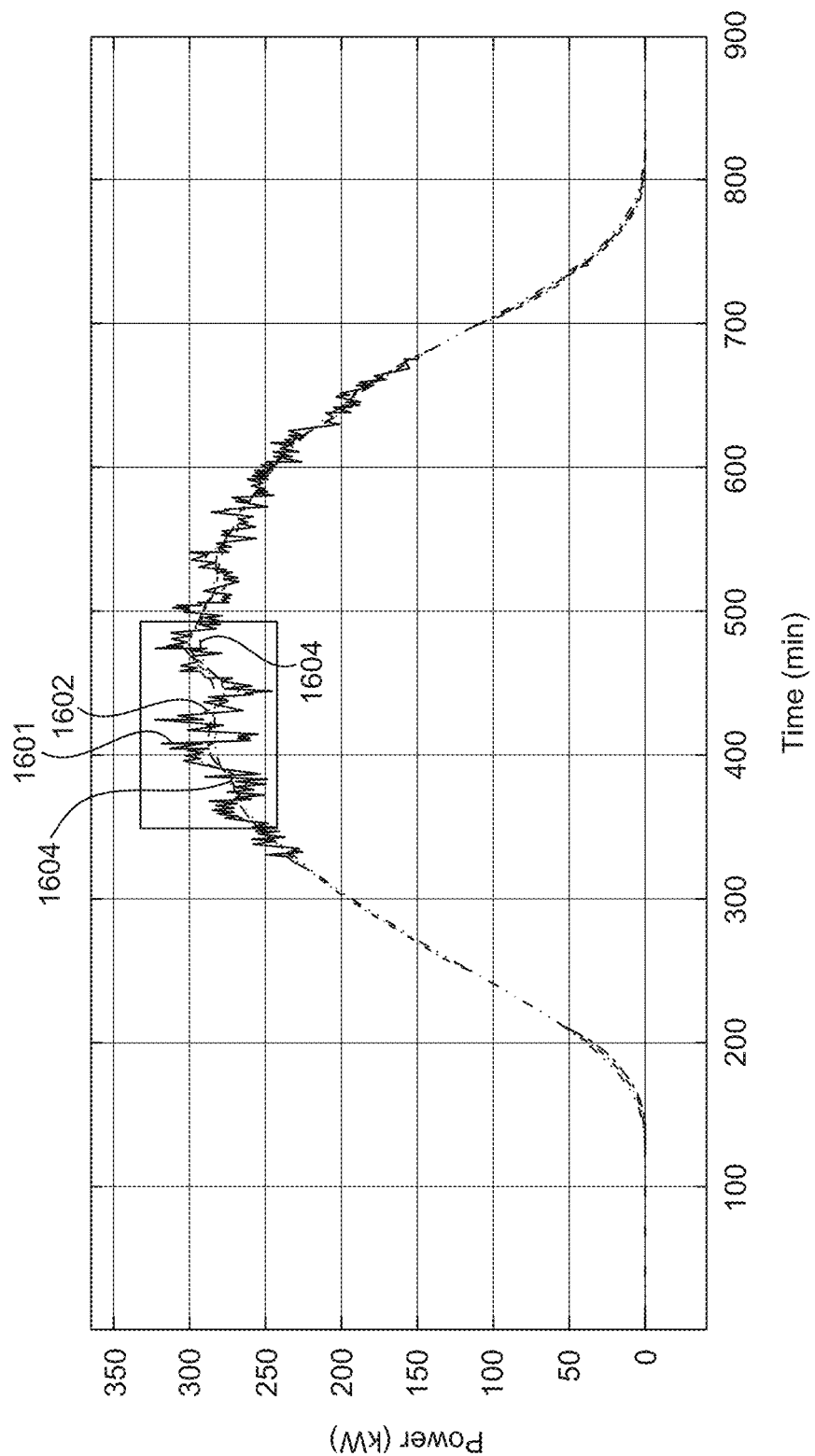
FIG. 16A represents a comparison of power smoothing performance of a Double Moving Average (DMA) filter against the MR filter, according to aspects of the present disclosure.
Figure 16B:
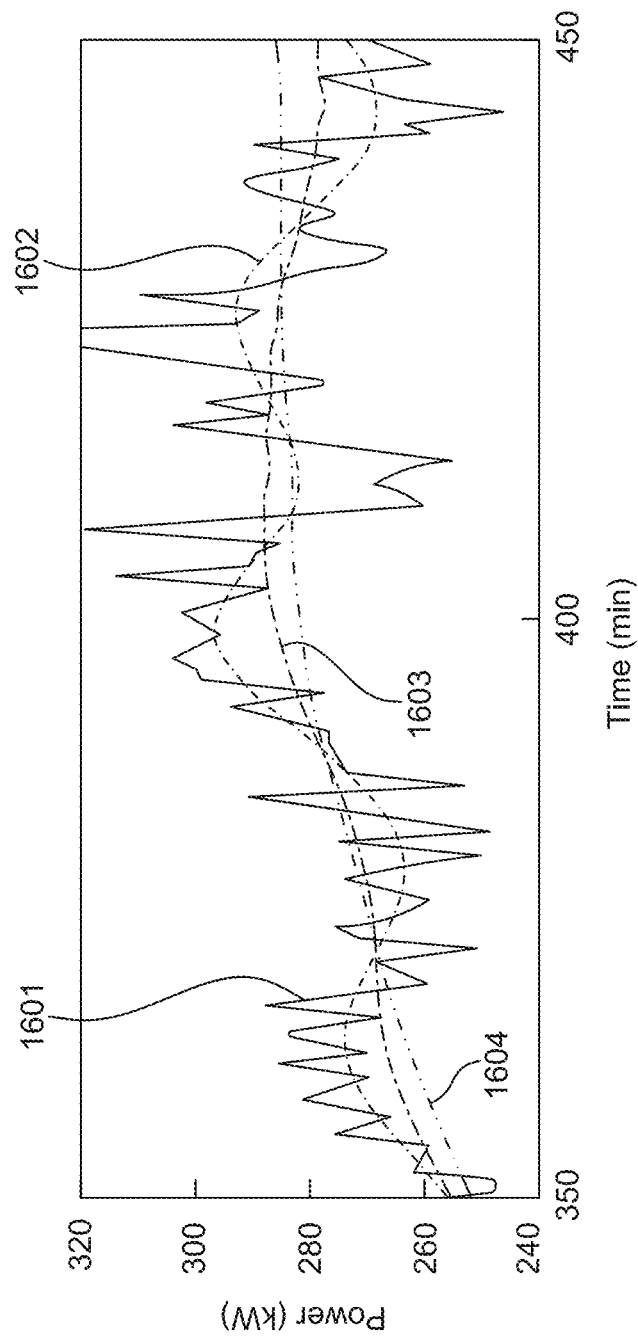
FIG. 16B is an enlarged view of the representation of FIG. 16A, according to aspects of the present disclosure.

FIG. 16A represents a comparison of power smoothing performance of the DMA filter against the MR filter. Further, FIG. 16B is an enlarged view of the representation of FIG. 16A. As shown in FIG. 16A and FIG. 16B, signal 1601 indicates the PV output generated by the PV module. The flattening performance of the DMA filter shown in FIG. 16A and FIG. 16B, suggests that it has a better smoothing and tracking performance than the regular MA filter in FIG. 13. However, FIG. 16A and FIG. 16B, also imply that although the DMA filter (W.S=48) (signal 1604) has a better power firming performance than the DMA filter (W.S=24) (signal 1603), there is still a lag produced in the output power by the DMA filter (W.S=48) (signal 1604). The MR filter output (signal 1602) in FIG. 16A and FIG. 16B, has a window size similar to the DMA filter with a windows size of 48 minutes, but it still operates to have greater smoothing performance with particularly good power trailing.

Figure 17:
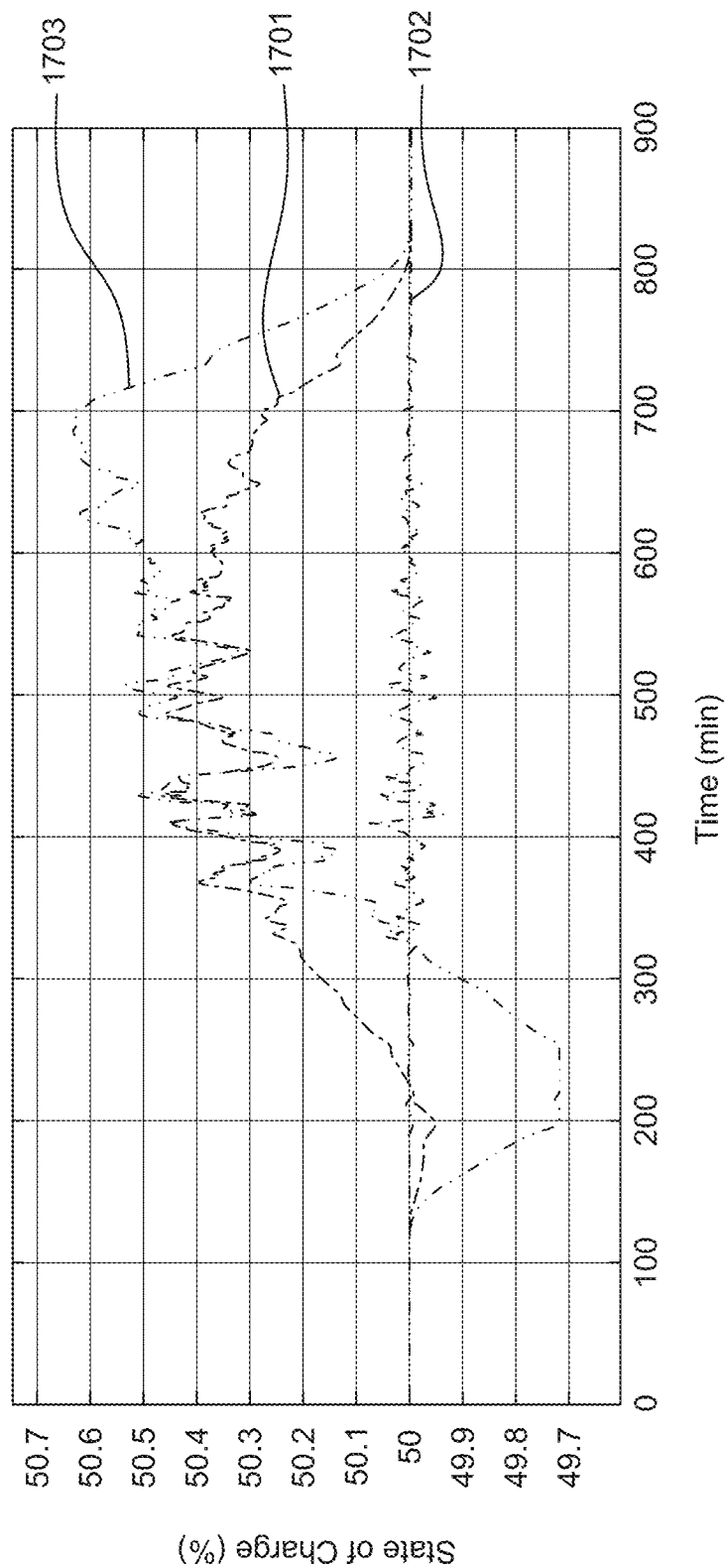
FIG. 17 represents a battery SoC comparison of the DMA filter against the MR filter, according to aspects of the present disclosure.

FIG. 17 represents a battery SoC comparison of the DMA filter against the MR filter. Both the DMA filters (shown in FIG. 17) (as displayed by signals 1701 and 1703) have poor SoC management performance. On the other hand, it can also be noted from FIG. 17 that the MR (W.S=45) (signal 1702) has proper SoC management while having a larger window size.

Figure 18:
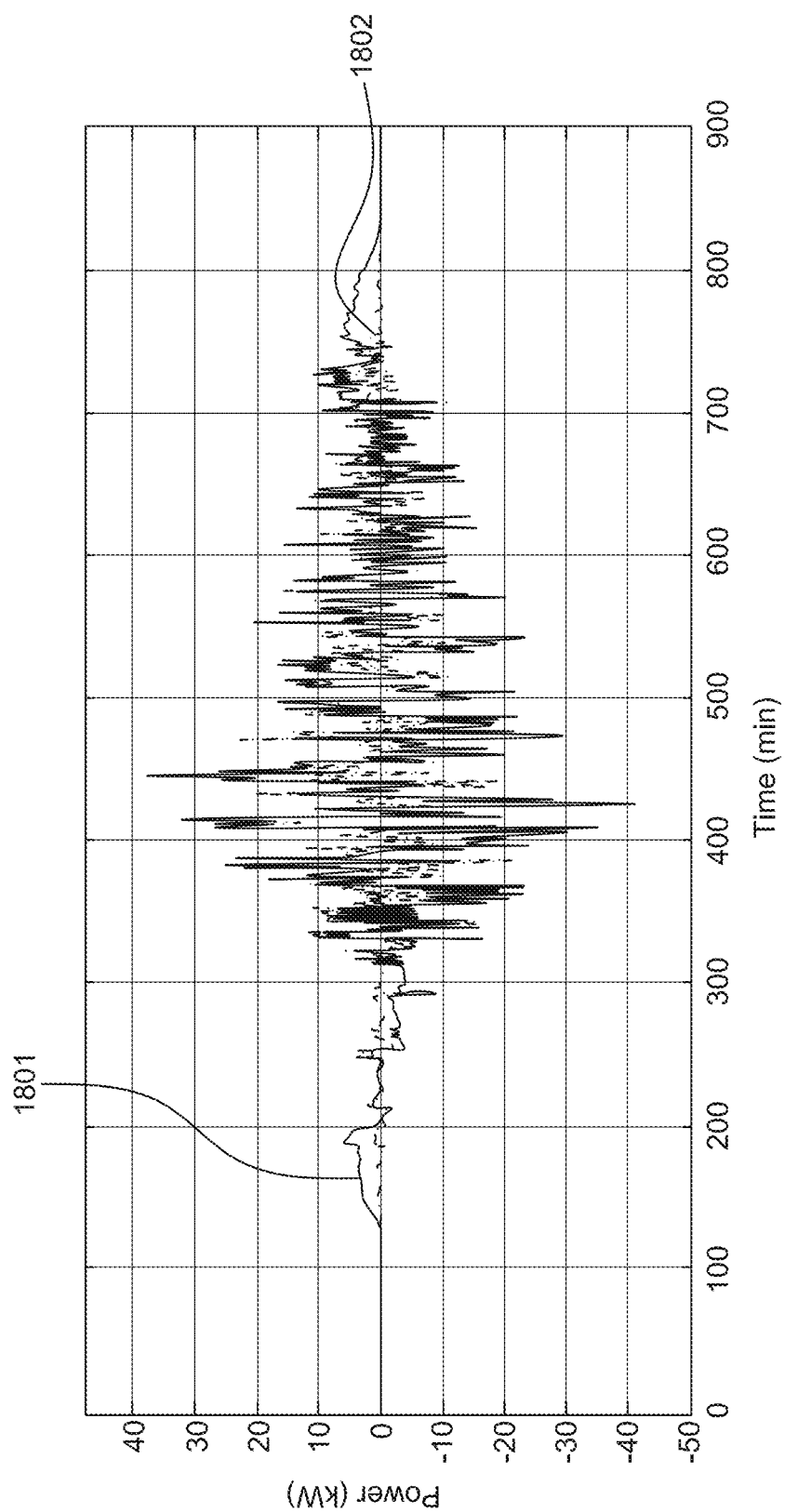
FIG. 18 represents a battery charging/discharging power performance comparison of the DMA filter against the MR filter, according to aspects of the present disclosure.

Further, FIG. 18 represents a battery charging/discharging power performance comparison of the DMA against the MR filter (as shown by signal 1802). Because of the MR filters time delay reduction capacity, the MR filter exceeds the DMA filters with reduced charging and discharging power and proper SoC management as shown in FIG. 17 and FIG. 18, respectively. As shown in FIG. 18, the DMA (W.S=48) (signal 1801) tends to deeply discharge the battery at around 200 minutes and overcharges at around the 700 minutes mark.

Figure 19A:
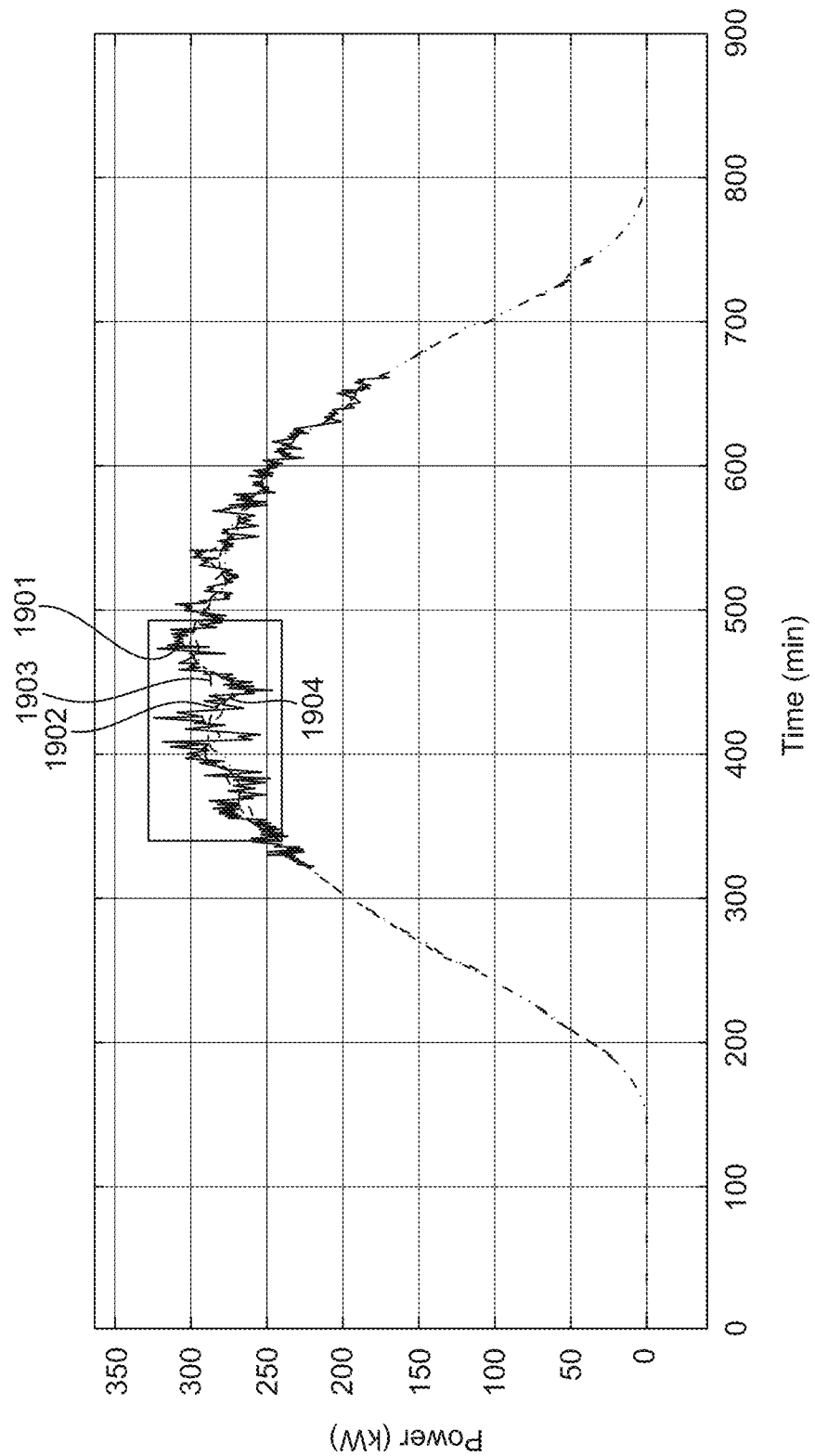
FIG. 19A represents a comparison of power smoothing performance of a Moving Median (MM) filter against the MR filter, according to aspects of the present disclosure.
Figure 19B:
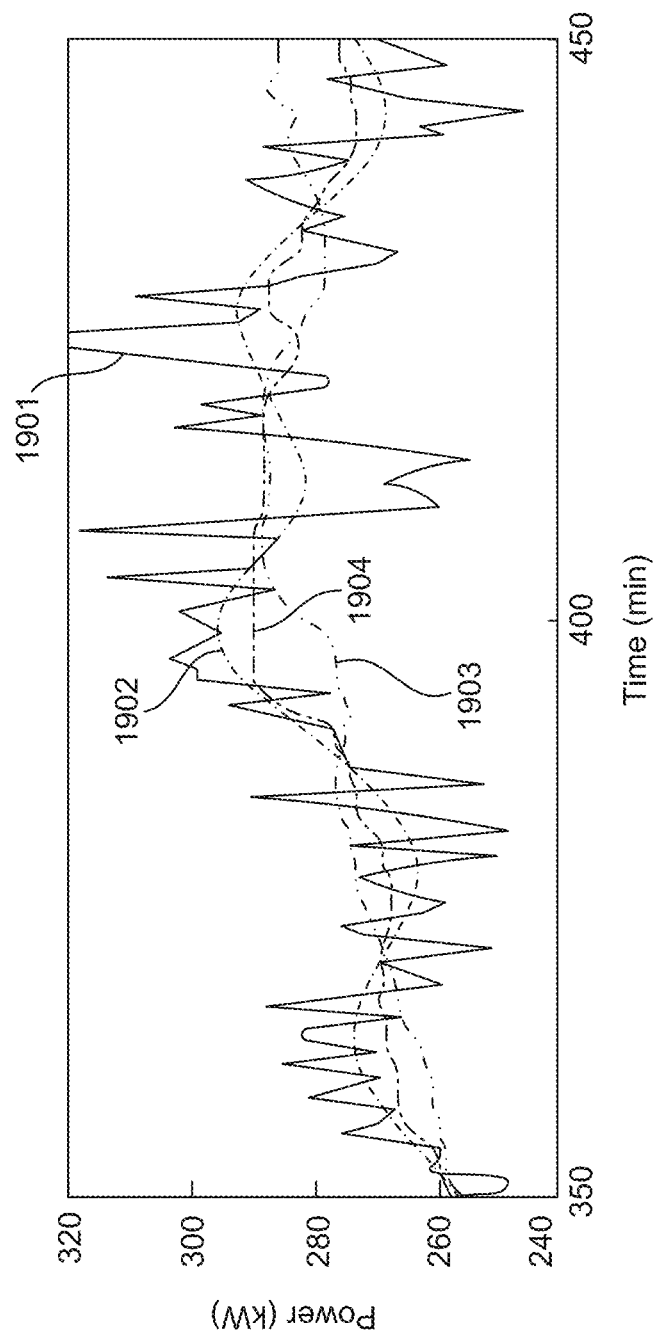
FIG. 19B is an enlarged view of the representation of FIG. 19A, according to aspects of the present disclosure.

FIG. 19A represents a comparison of power smoothing performance of the MM filter against MR filter. FIG. 19B is an enlarged view of the representation of FIG. 19A. As shown in FIG. 19A and FIG. 19B, signal 1901 indicates the PV output generated by the PV module. It can be seen from FIG. 19A and FIG. 19B that the MM filter (signals 1903, and 1904) has better power tracking than both the MA and DMA filters. However, the MM filter lacks behind the MA and DMA filters in terms of smoothing ability. The MR filter (signal 1902) has improved power smoothing and trailing than both the MM filters of window sizes 24 and 48 minutes.

Figure 20:
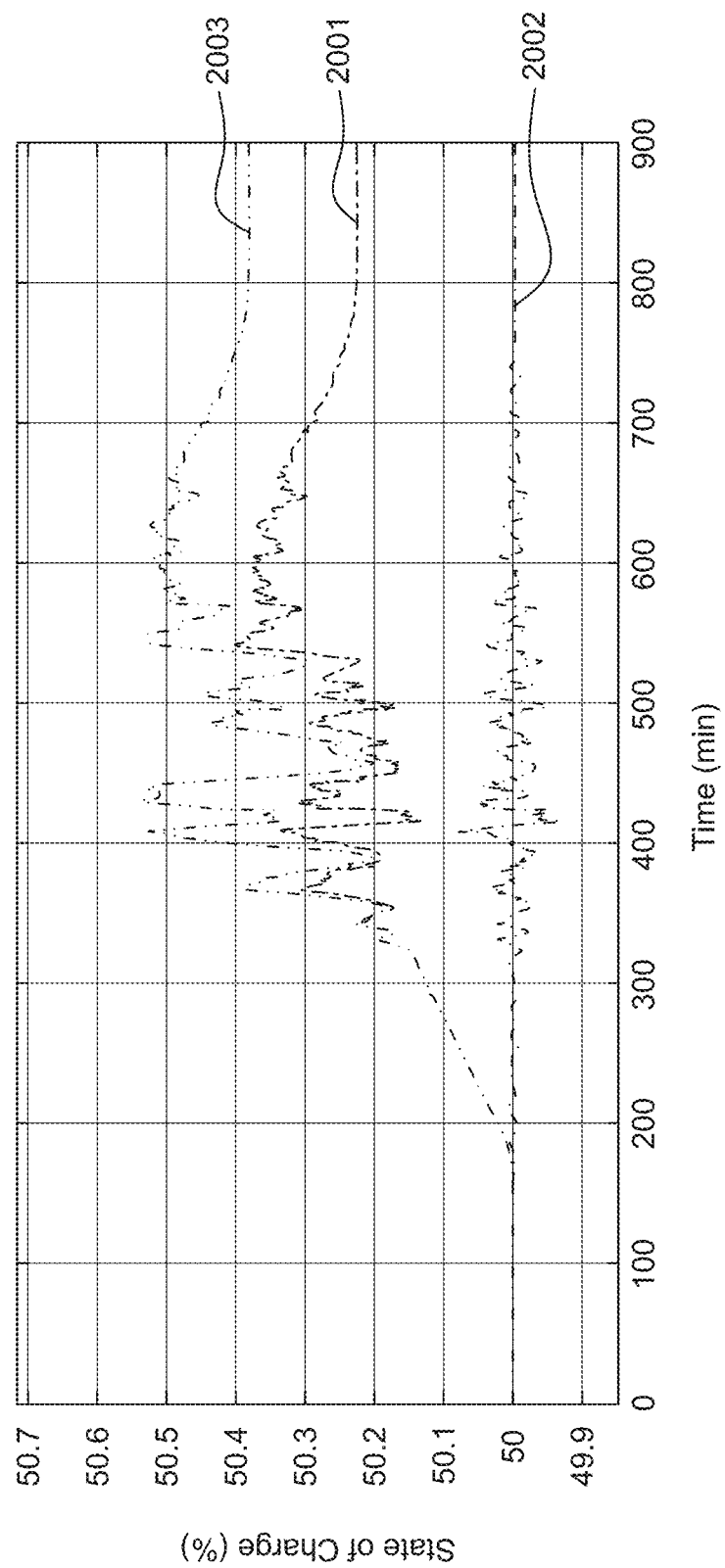
FIG. 20 represents a battery SoC comparison of the MM filter against the MR filter, according to aspects of the present disclosure.

FIG. 20 represents a battery SoC comparison of the MM filter against the MR filter. Also, since the MM filters have poor smoothing performances, it results in poor SoC management which can be shown by signal 2001, and 2003 from FIG. 20. The MM (W.S=48) (signal 2003) in particular tends to overcharge the associated battery. In contrast, the MR filter (signal 2002) maintains the battery state of charge.

Figure 21:
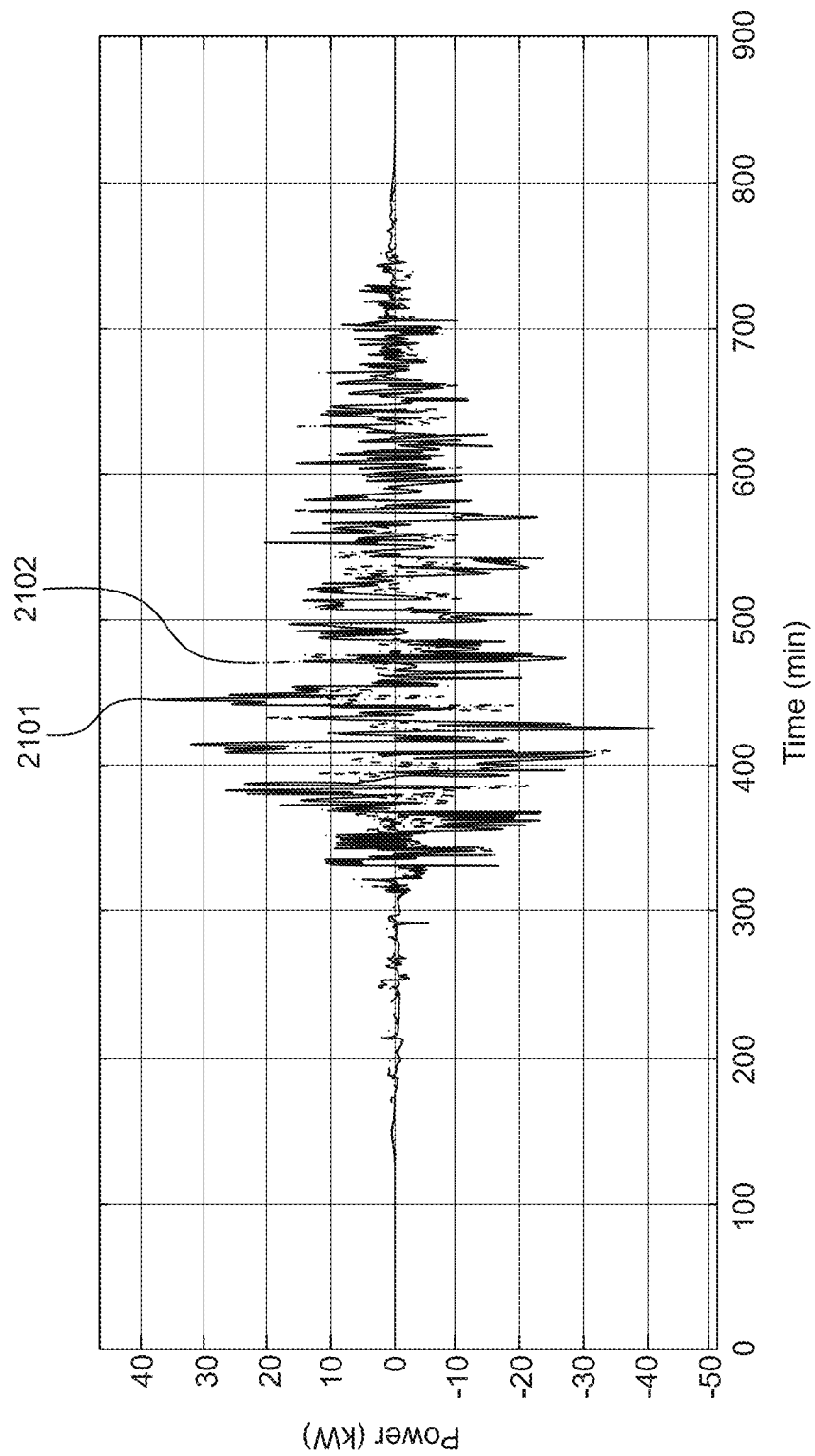
FIG. 21 represents a battery charging/discharging power performance comparison of the MM filter against the MR filter, according to aspects of the present disclosure.

FIG. 21 represents a battery charging/discharging power performance comparison of the MM filter against the MR filter. FIG. 21 demonstrates the battery charging/discharging power, and as expected the MM (W.S=48) (signal 2101) has higher charging and discharging power than the MR filter (W.S=45) (signal 2102) due to its time delay characteristic.

Figure 22A:
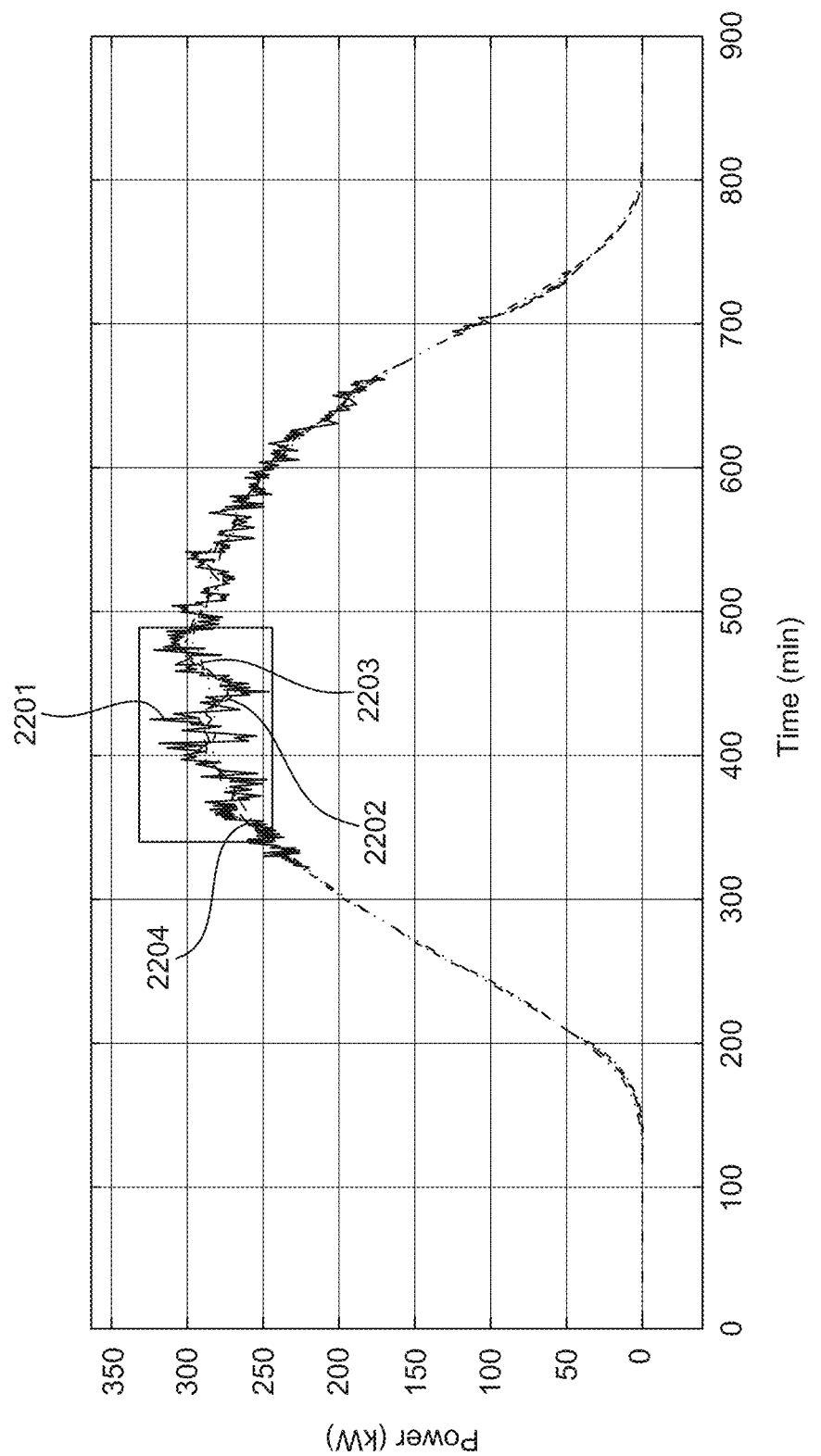
FIG. 22A represents a comparison of power smoothing performance of a Savitsky-Golay (SG) filter against the MR filter, according to aspects of the present disclosure.
Figure 22B:
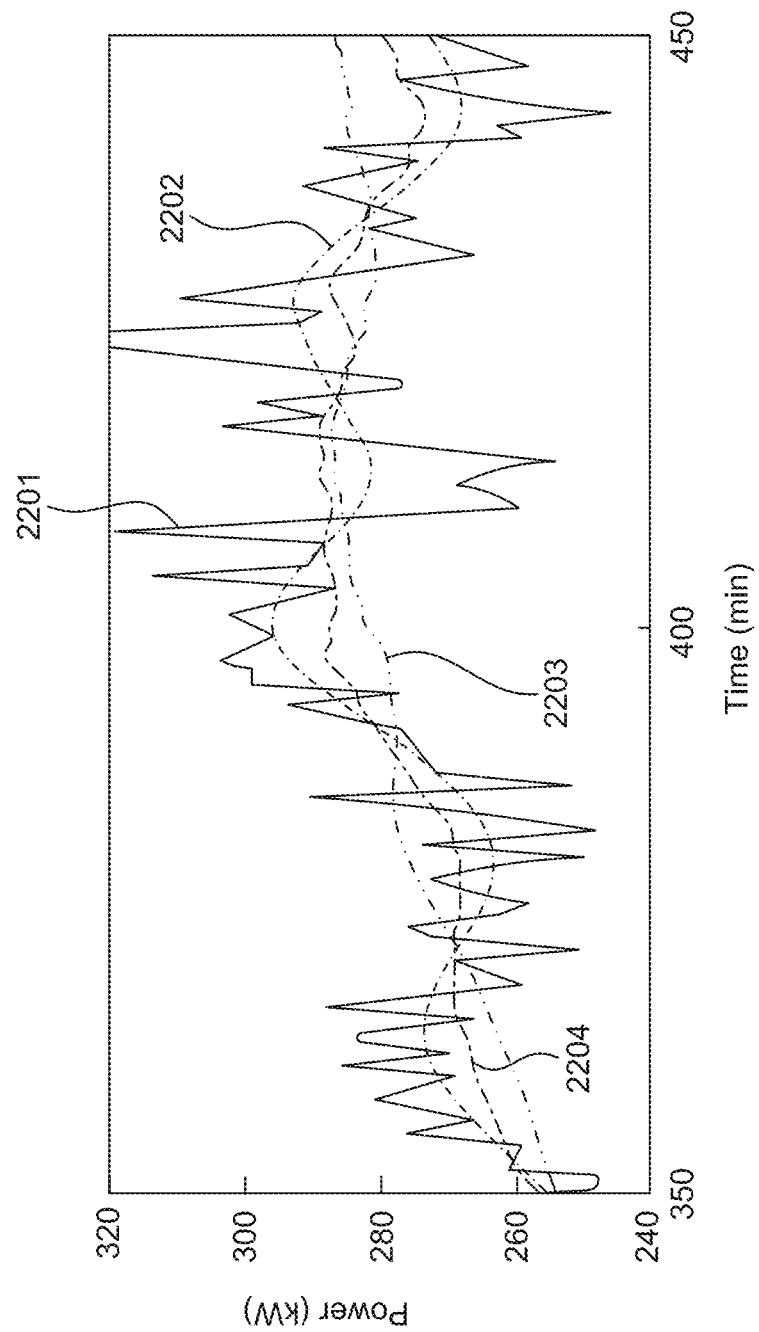
FIG. 22B is an enlarged view of the representation of FIG. 22A, according to aspects of the present disclosure.
Figure 23:
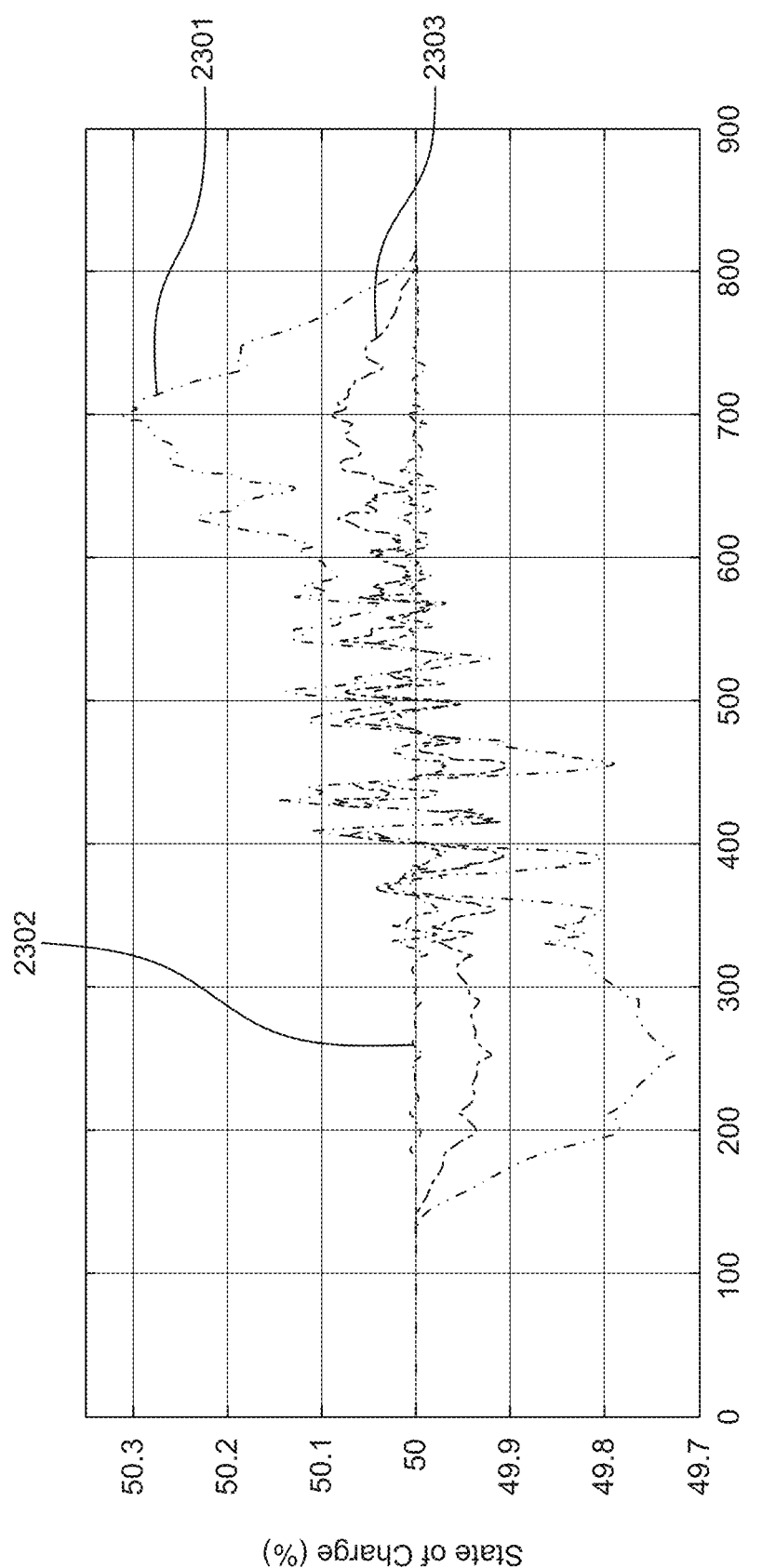
FIG. 23 represents a battery SoC comparison of the SG filter against the MR filter, according to aspects of the present disclosure.

FIG. 22A represents a comparison of power smoothing performance of the SG filter against the MR filter. Further, FIG. 22B is an enlarged view of the representation of FIG. 22A. As shown in FIG. 22A and FIG. 22B, signal 2202 shows the power smoothing performance of the MR filter (W.S=45). Further, FIG. 23 represents a battery SoC comparison of the SG filter against the MR filter, according to aspects of the present disclosure. Signal 2201 indicates the PV output generated by the PV module. The SG filter, used for solar power smoothing, surpasses the MA, DMA and MM filters in terms of both power leveling and tracking capacity. The SG filters smoothing performance is exhibited in FIGS. 22A and 22B, and although both the SG filters (signals 2203, and 2204) have good quality tracking, they still have poor battery SoC, and this is clearly visible from FIG. 23 (indicated by signals 2301 and 2303). In FIG. 23, signal 2302 shows maintaining the battery state of charge by the MR filter. Even though the SG filter (W.S=53) (signal 2301) has a slight lag from SG (W.S=27) (signal 2303), it is still large enough to have a significant impact on the battery's SoC performance (shown in FIG. 23).

Figure 24:
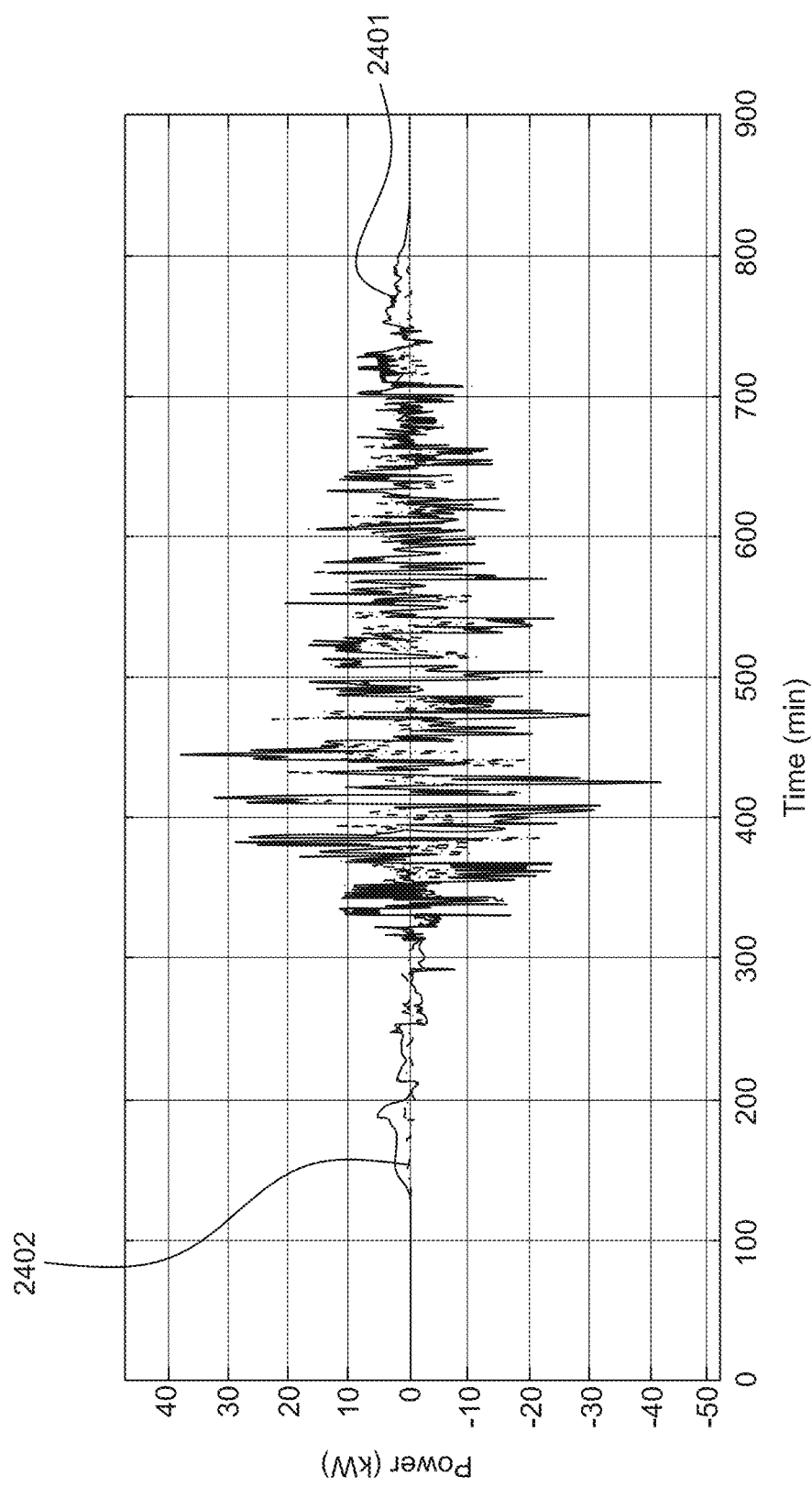
FIG. 24 represents a battery charging/discharging power performance comparison of the SG filter against the MR filter, according to aspects of the present disclosure.

FIG. 24 represents a battery charging/discharging power performance comparison of the SG filter against the MR filter. Since the MR filter (W.S=45) (signal 2402) has unique power trailing, it results in a relatively less battery charging and discharging power than the SG (W.S=53) (signal 2401) which can be observed from FIG. 24.

Figure 25A:
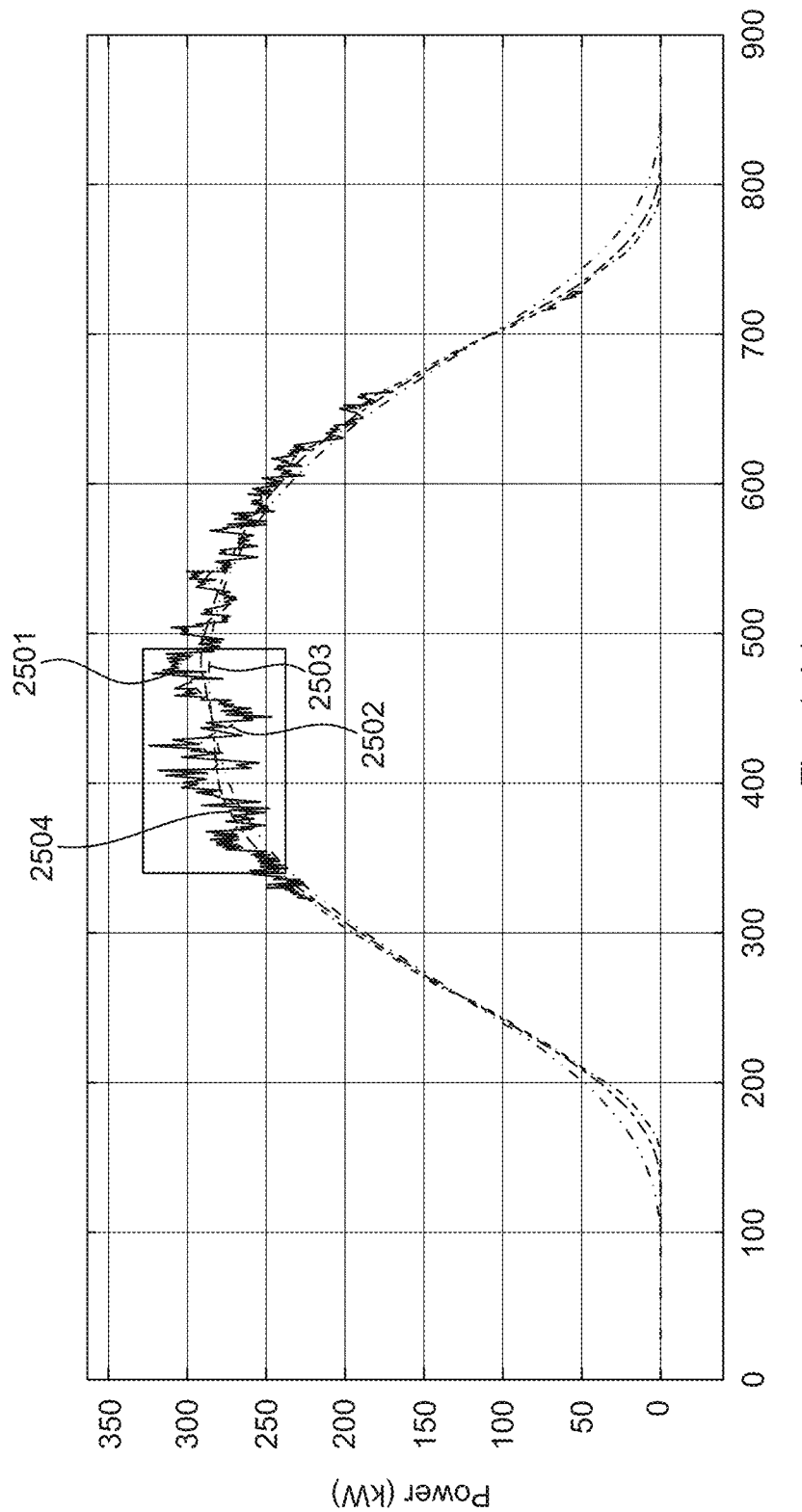
FIG. 25A represents a comparison of power smoothing performance of a gaussian filter (GF) against the MR filter, according to aspects of the present disclosure.
Figure 25B:
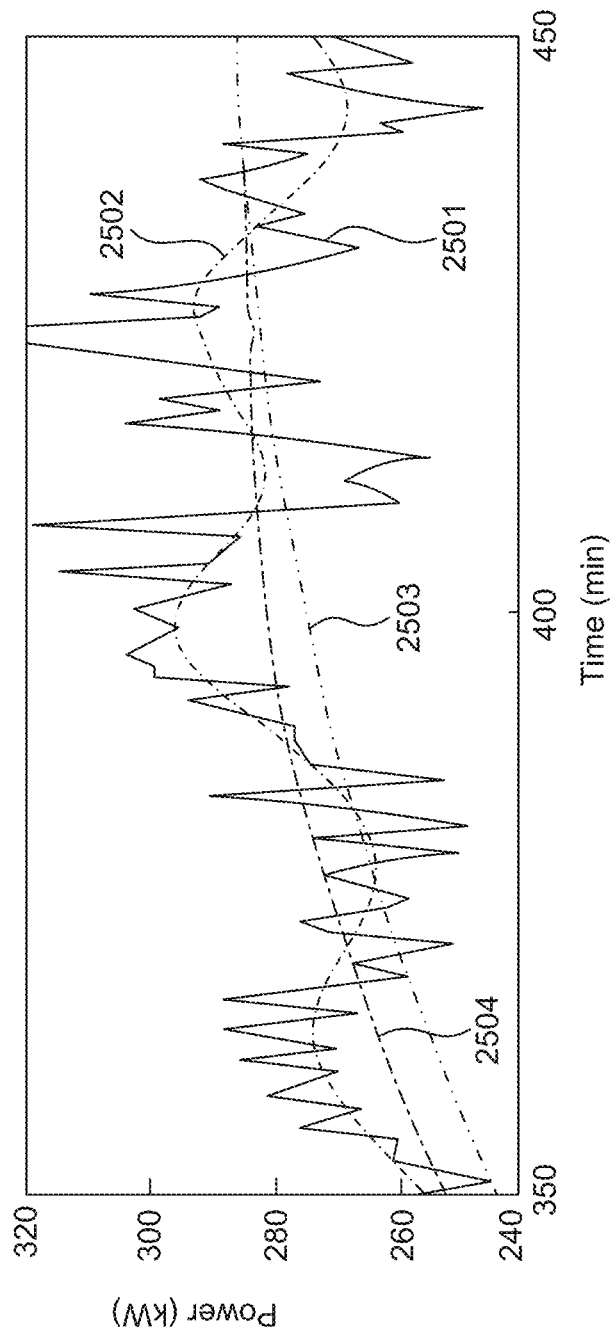
FIG. 25B is an enlarged view of the representation of FIG. 25A, according to aspects of the present disclosure.

FIG. 25A represents a comparison of power smoothing performance of the GF against the MR filter. FIG. 25B is an enlarged view of the representation of FIG. 25A. As shown in FIG. 25A and FIG. 25B, signal 2501 indicates the PV output generated by the PV module. The Gaussian Filter has good power tracking (displayed in FIG. 24), but the GF tends to over smooth the solar power data which results in the loss of the PV power signal characteristics, as shown by signal 2503, and 2504 in FIG. 25.A and FIG. 25B The MR filter of window size 45 (signal 2502) has improved power smoothing in comparison with the GF.

Figure 26:
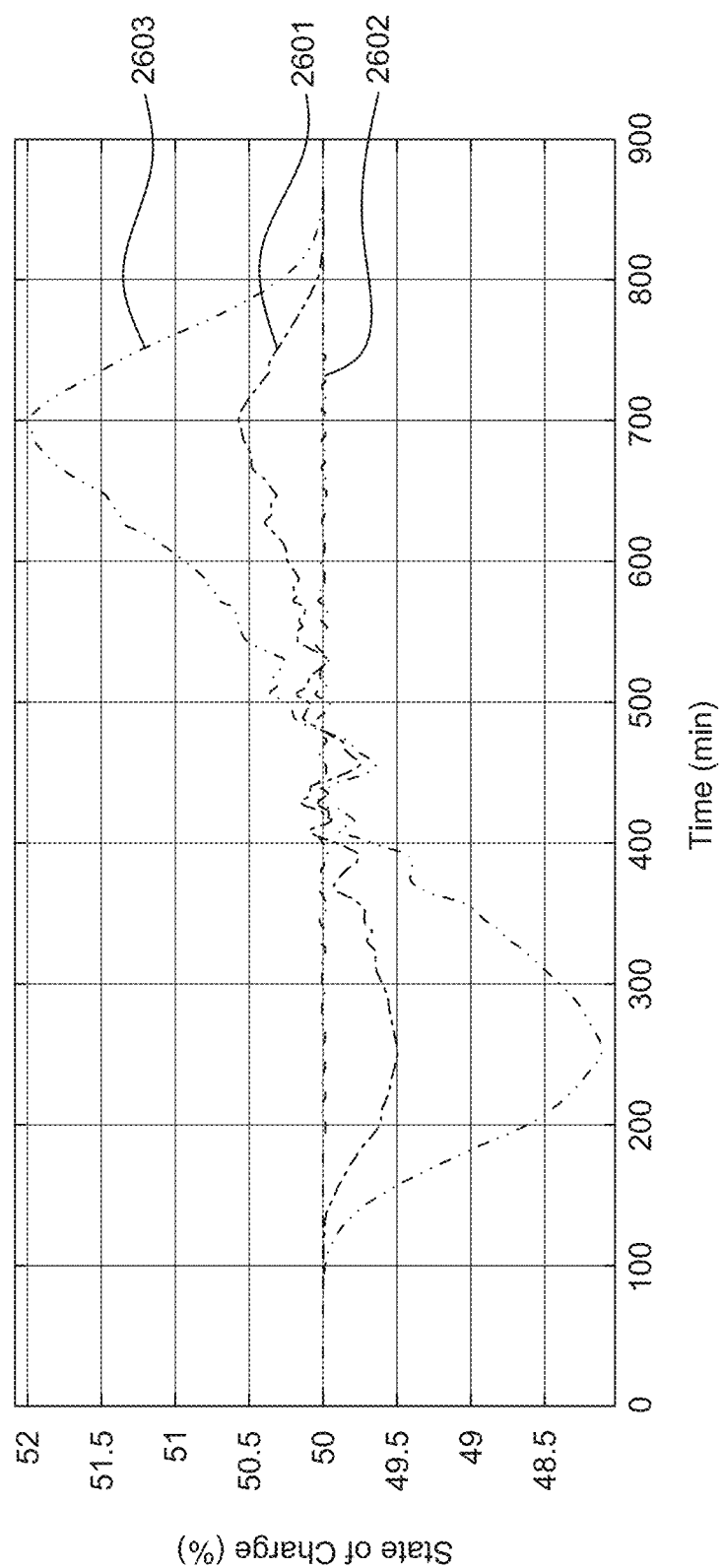
FIG. 26 represents a battery SoC comparison of the GF against the MR filter, according to aspects of the present disclosure.
Figure 27:
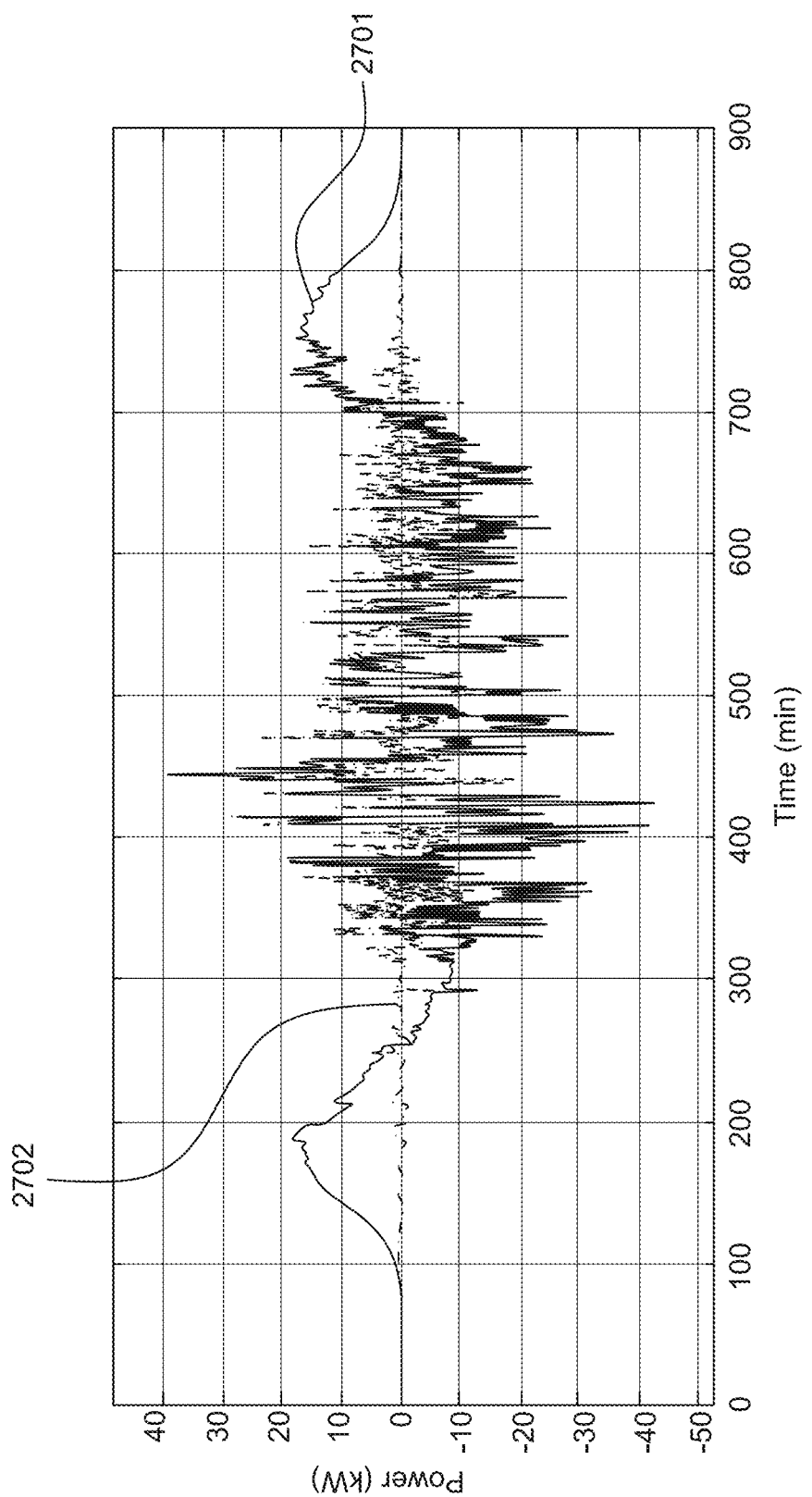
FIG. 27 represents a battery charging/discharging power performance comparison of the GF against the MR filter, according to aspects of the present disclosure.

FIG. 26 represents a battery SoC comparison of the GF against the MR filter, and FIG. 27 represents a battery charging/discharging power performance comparison of the GF against the MR filter according to aspects of the present disclosure. From FIGS. 25A and 25B, it can be concluded that over smoothing of the solar power negatively effects the battery as it results in extremely poor SoC management. Both the GF filters (as displayed by signals 2601 and 2603) have poor SoC management performance. On the other hand, the MR (W.S=45) (signal 2602) has proper SoC management while having a larger window size.

Additionally, over smoothing also greatly increases the battery charging and discharging power which can be seen in FIG. 27. Since the use of MR filter does not result in the loss of the original PV power characteristic and due to its exceptional power tracking (shown in FIG. 25), the MR filter results in a reduced battery charging/discharging power (FIG. 27) shown as signal 2702. while having appropriate SoC management (shown in FIG. 26). Signal 2701 indicates the battery charging and discharging power associated with the GF (W.S.=48).

Figure 28A:
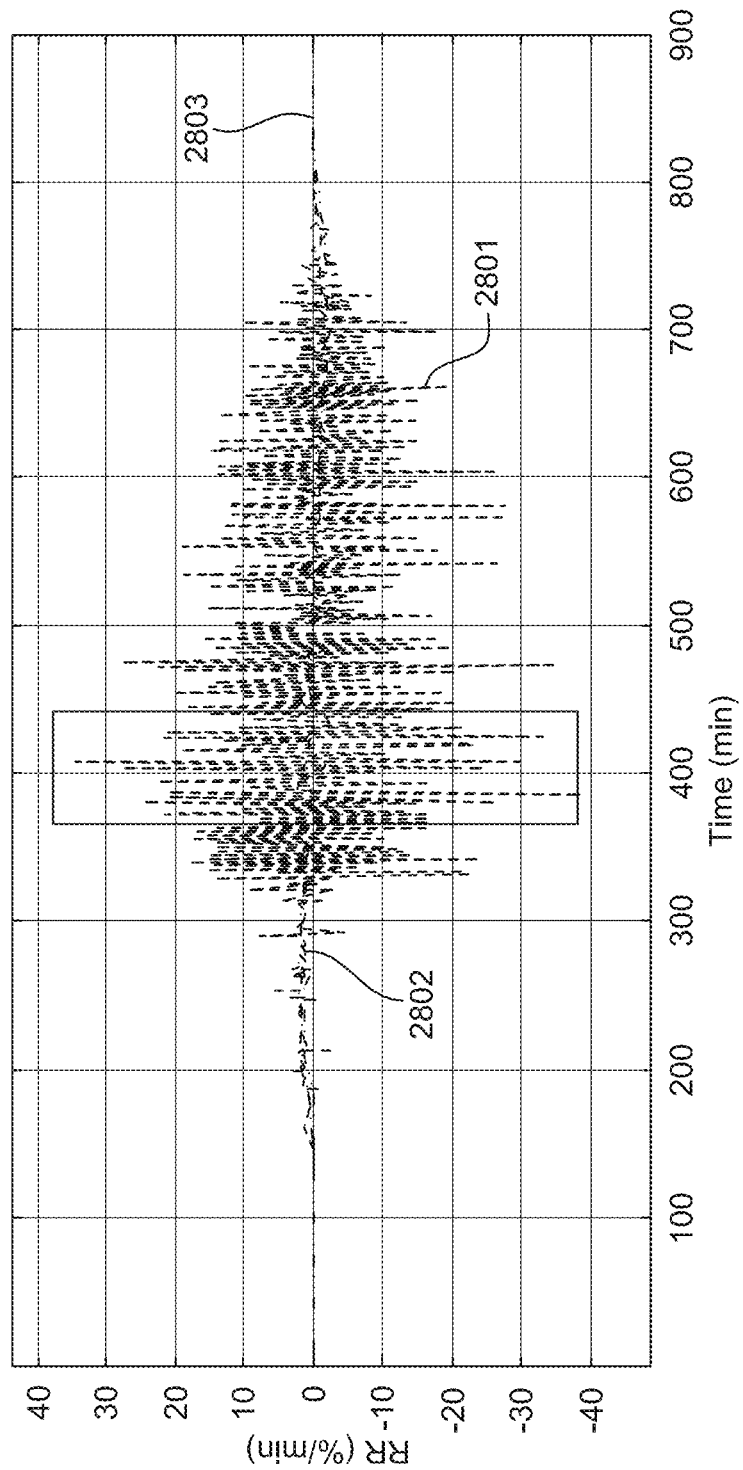
FIG. 28A represents a solar power ramp rate comparison of the LPF against the MR filter, according to aspects of the present disclosure.
Figure 28B:
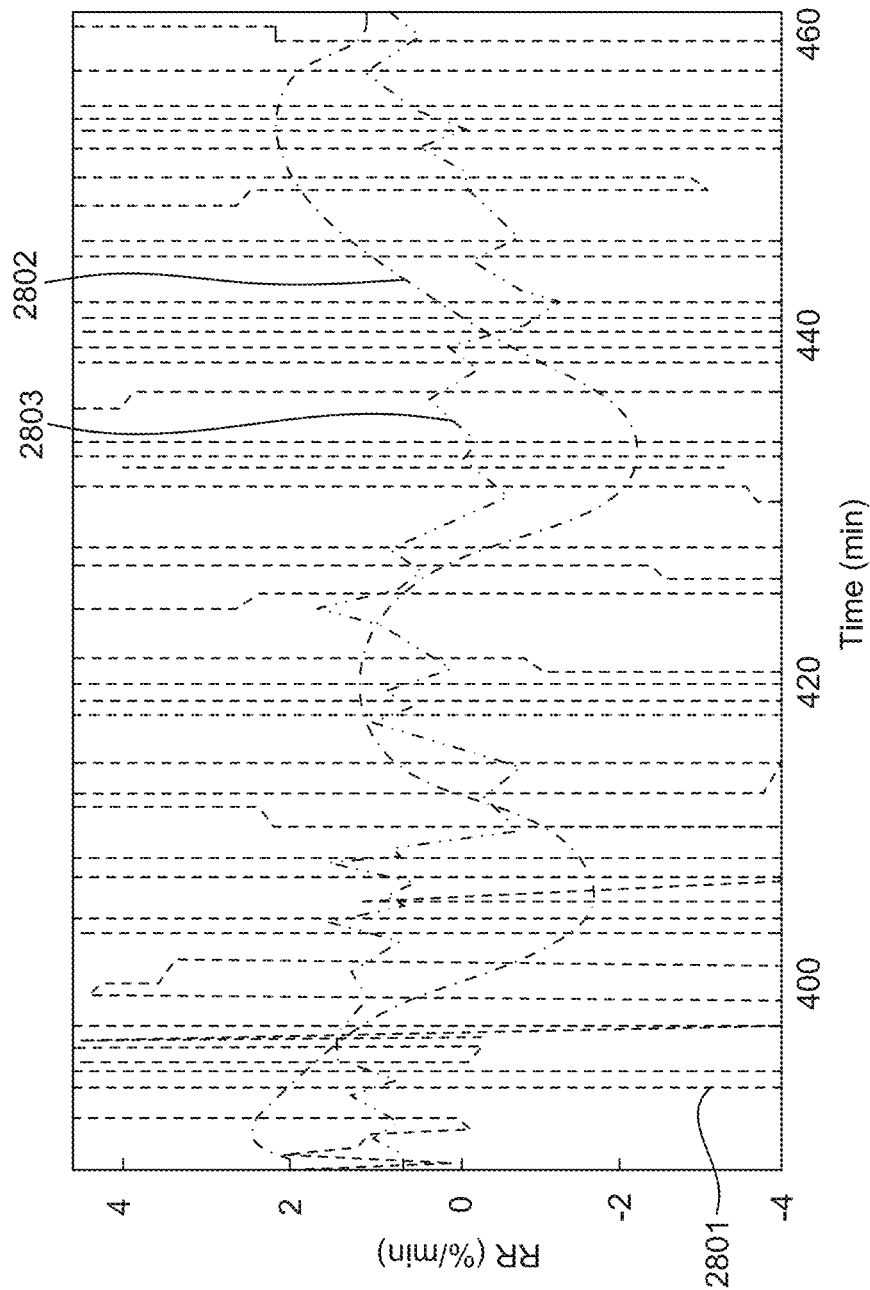
FIG. 28B is an enlarged view of the representation of FIG. 28A, according to aspects of the present disclosure.

The fluctuation rate of the PV power to be dispatched into the grid is analyzed. The ramp rate of the unsmoothed solar power is compared to the proposed MR filter and various other previously mentioned filters combined with the SoC feedback control FIG. 28A shows the ramp rate comparison of the PV power against the LPF and the MR filter. Further FIG. 28B is an enlarged view of the representation of FIG. 28A. As shown in FIG. 28A and FIG. 28B, signal 2801 indicates unfiltered PV power. Although the LPF filter manages to reduce the ramp rate (as shown by signal 2803), the MR filter (signal 2802) achieves significantly better ramp rate reduction along with considerably improved smoothing, tracking and battery SoC performance.

Figure 29A:
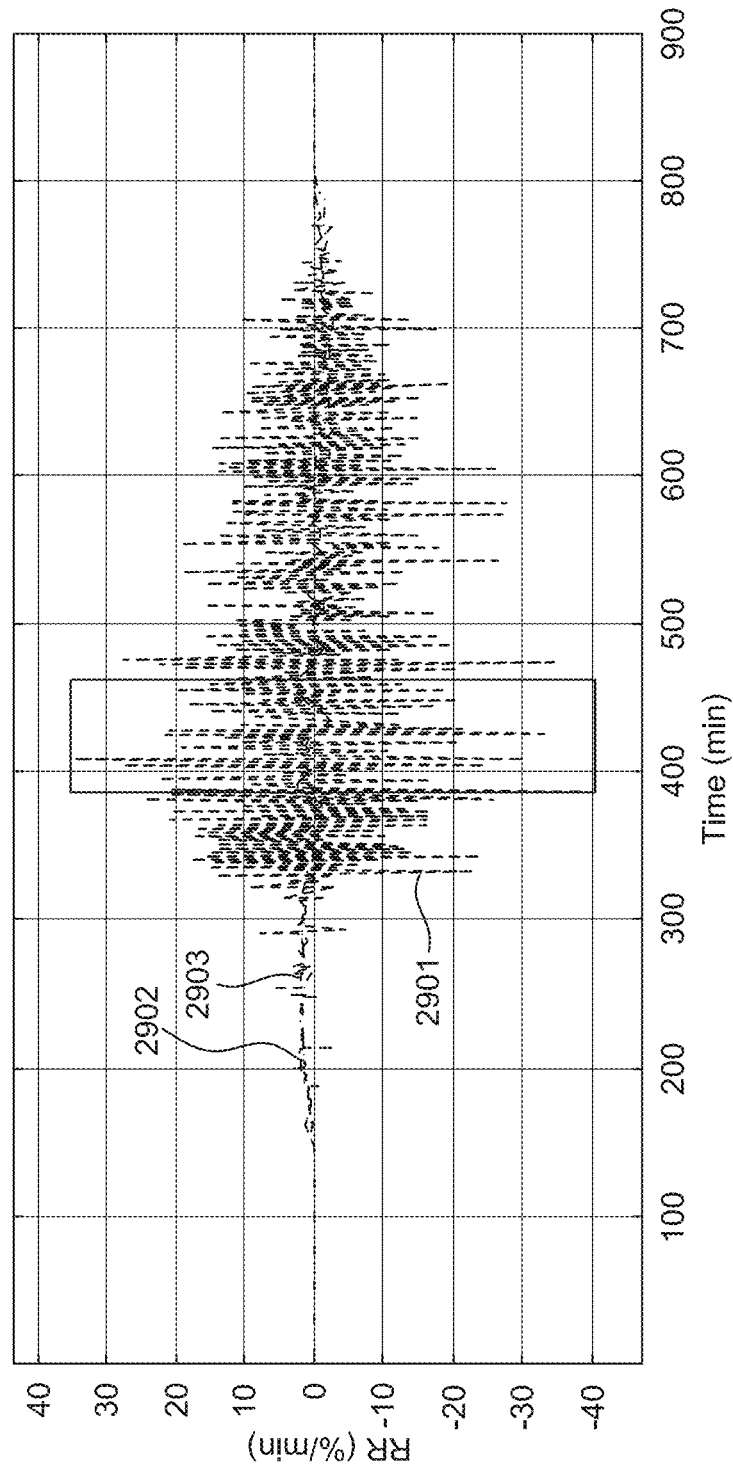
FIG. 29A represents a solar power ramp rate comparison of the MA filter against the MR filter, according to aspects of the present disclosure.
Figure 29B:
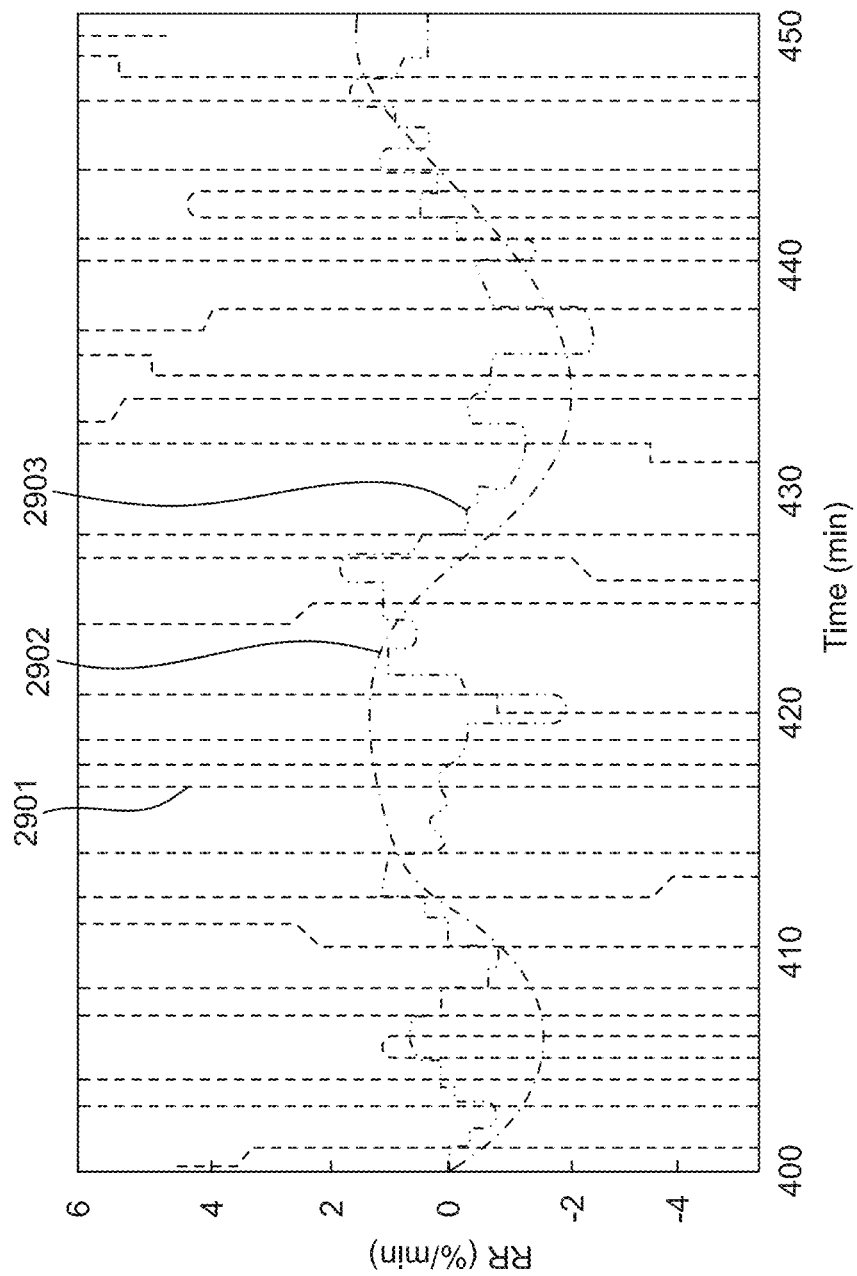
FIG. 29B is an enlarged view of the representation of FIG. 29A, according to aspects of the present disclosure.

FIG. 29A represents a solar power ramp rate comparison of the MA filter against the MR filter. FIG. 29B is an enlarged view of the representation of FIG. 29A. As shown in FIG. 29A and FIG. 29B, signal 2901 indicates unfiltered PV power. The MR filter (signal 2902) achieves significantly better ramp rate reduction as compared with MA filter (as shown by signal 2903).

Figure 30A:
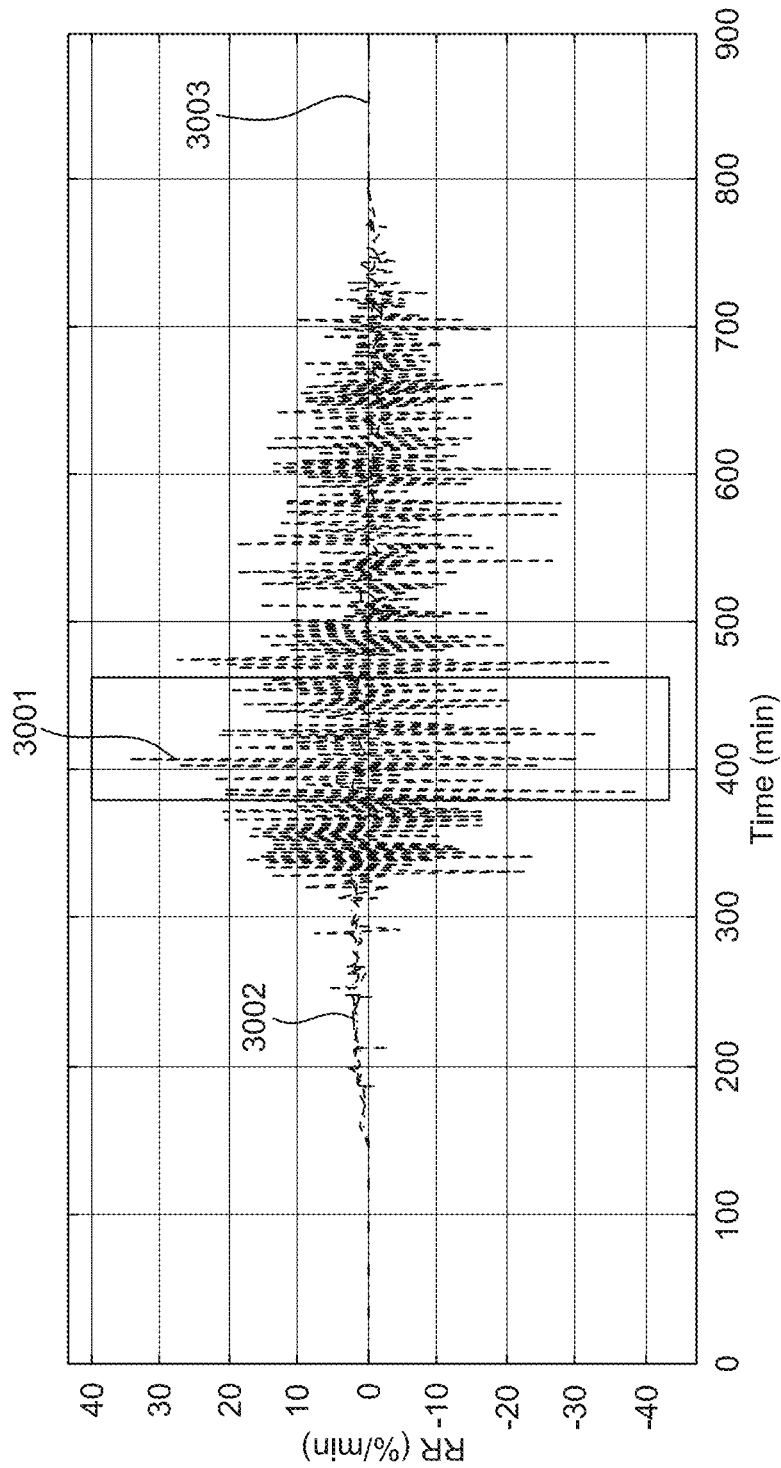
FIG. 30A represents a solar power ramp rate comparison of the MM filter against the MR filter, according to aspects of the present disclosure.
Figure 30B:
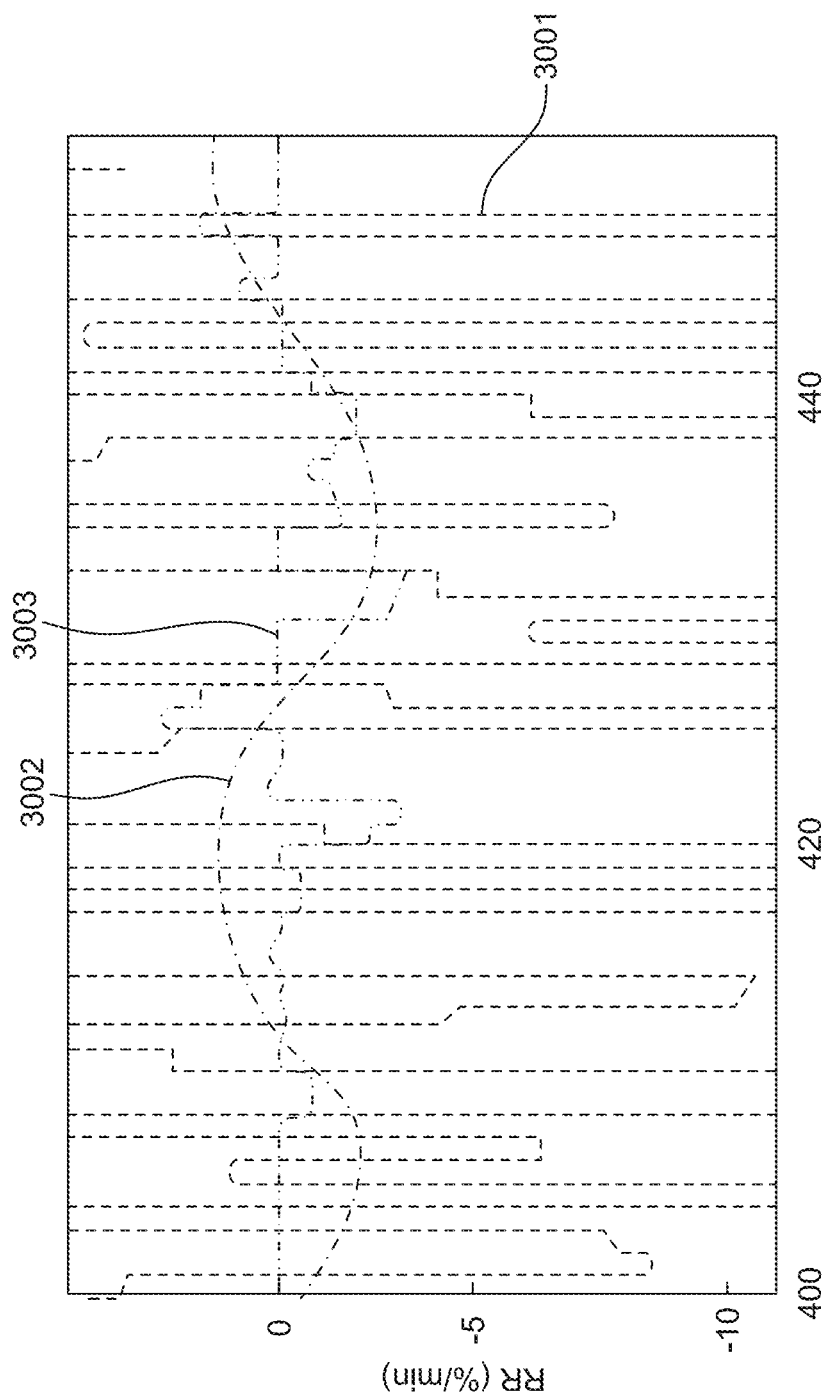
FIG. 30B is an enlarged view of the representation of FIG. 30A, according to aspects of the present disclosure.

FIG. 30A represents a solar power ramp rate comparison of the MM filter against the MR filter, according to aspects of the present disclosure. Further, FIG. 30B is an enlarged view of the representation of FIG. 30A. As shown in FIG. 30A and FIG. 30B, signal 3001 indicates unfiltered PV power. The MM filter manages to reduce the ramp rate (as shown by signal 3003). However, the MR filter (signal 3002) achieves significantly better ramp rate reduction along with considerably improved smoothing, tracking and battery SoC performance.

Figure 31A:
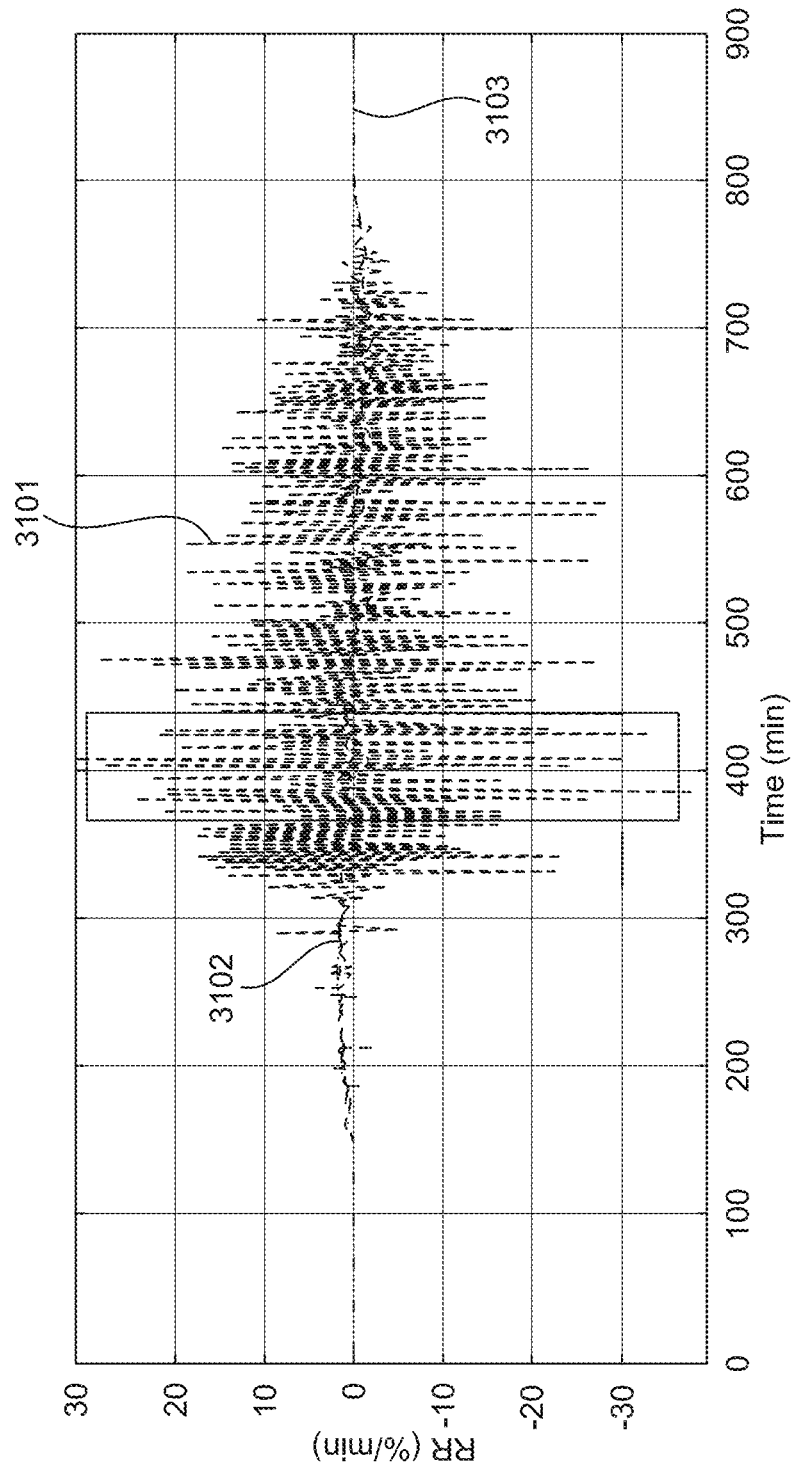
FIG. 31A represents a solar power ramp rate comparison of the SG filter against the MR filter, according to aspects of the present disclosure.
Figure 31B:
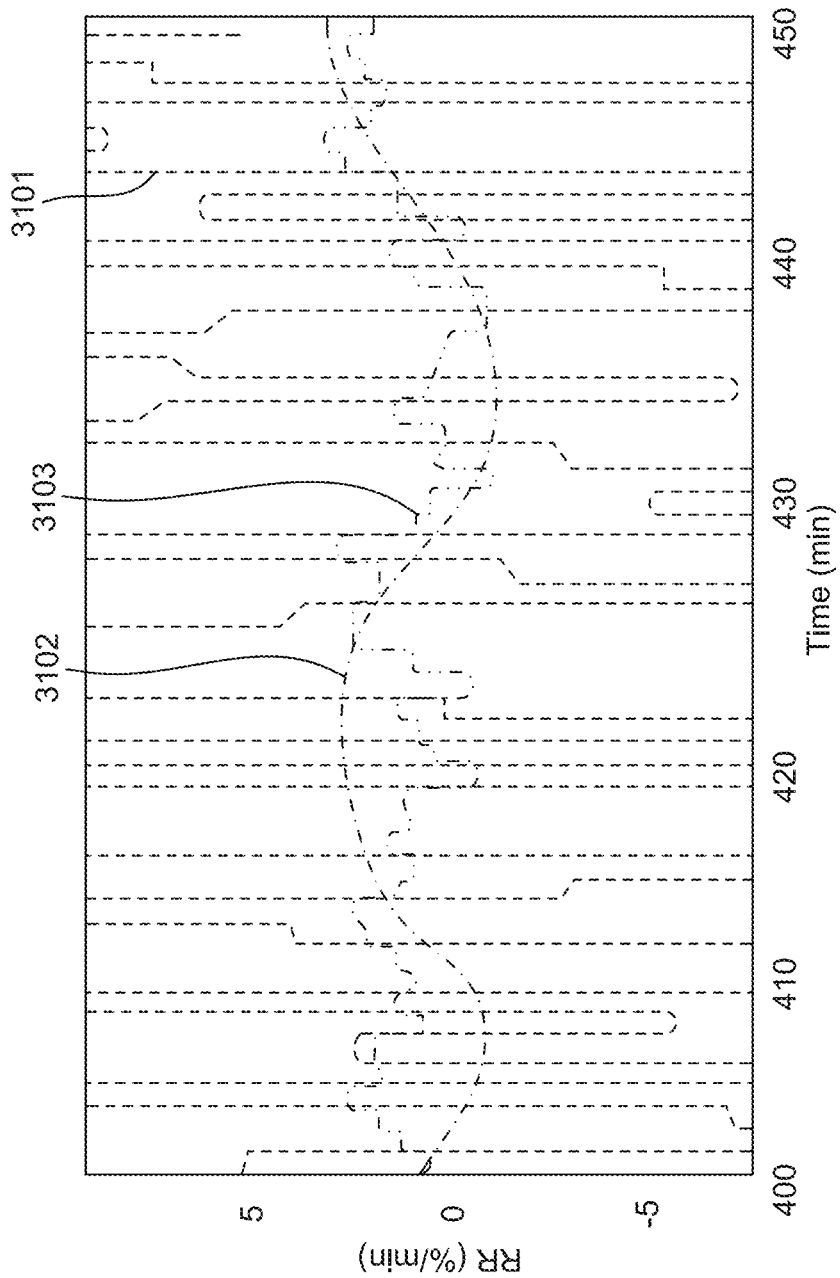
FIG. 31B is an enlarged view of the representation of FIG. 31A, according to aspects of the present disclosure.

FIG. 31A represents a solar power ramp rate comparison of SG against MR filter, according to aspects of the present disclosure. Further, FIG. 31B is an enlarged view of the representation of FIG. 31A. As shown in FIG. 31A and FIG. 31B, signal 3101 indicates unfiltered PV power. The SG filter reduces the ramp rate (as shown by signal 3103). However, the MR filter (signal 3102) achieves a significantly ramp rate reduction.

As evident from FIGS. 29A, 29B, 30A, 30B, 31A, and 31B, even though ramp rate reduction can be achieved by all the filters described and simulated, the MR filter achieves the most suitable ramp rate control.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A solar photovoltaic (PV) network comprising:
   a PV module;
   a Moving Regression (MR) filter;
   a State of Charge (SoC) feedback control;
   a Battery Energy Storage System (BESS); and
   an electrical grid,
   wherein the PV module comprises a PV array that receives solar light signals and generates unsmoothed solar PV power output, wherein the unsmoothed solar PV power output is electrically coupled to the MR filter and the SoC feedback control,
   wherein each of the MR filter, the SoC feedback control and the BESS are electrically coupled to provide a combined smoothed solar PV power output, wherein the smoothed solar PV power output is electrically coupled to the electrical grid, and
   wherein the MR filter is a non-parametric smoother that is configured to smooth an electrical input with machine learning linear regression over a plurality of time steps.

2. The network of claim 1, wherein the MR filter, the SoC feedback control and the BESS are configured to provide smoothing of solar PV variabilities.

3. The network of claim 1, wherein the MR filter and the SoC feedback control receive the unsmoothed solar PV power output from the PV module.

4. The network of claim 3, wherein the PV module further comprises a boost converter.

5. The network of claim 1, wherein the MR filter and is configured to reduce a power lag and a ramp rate for the PV network.

6. The network of claim 1, wherein the MR filter and SoC feedback control are each configured to reduce a power lag and a ramp rate for the PV network.

7. The network of claim 1, wherein the MR filter and SoC feedback control are configured to control charging and discharging of the BESS.

8. The network of claim 1, wherein the MR filter is a non-parametric smoother that utilizes a machine learning concept of linear regression to smooth out solar PV variations at every time step.

9. The network of claim 8, wherein based on a first window size of the MR filter, k neighboring points of a target value are used as training values for a linear regression algorithm.

10. The network of claim 9, further wherein based on a second window size larger than the first window size additional neighboring points are used for training the linear regression algorithm in the MR filter so that the MR filter provides a higher accuracy of a predicted smoothed value of solar PV power output in comparison to a low pass filter, a moving average filter, a double moving average filter, a moving median filter, a Savitsky-Golay filter, or a gaussian filter.

11. The network of claim 1, wherein the PV solar system having a higher degree of PV power smoothing and power tracking and decreased battery charging and discharging in comparison to a low pass filter, a moving average filter, a double moving average filter, a moving median filter, a Savitsky-Golay filter, or a gaussian filter.

12. A method of providing a solar photovoltaic (PV) power to an electrical grid, the method comprising:
   receiving solar signals by a PV module;
   generating, by the PV module, an unsmoothed solar PV power output power ($P_{PV}$) and coupling the $P_{PV}$ to a MR filter and to a SoC feedback control;
   generating, by the MR filter, a filter smooth output power ($P_{PO}$);
   generating a power reference output ($P_{ref}$) by combining $P_{PO}$ and an output of the SoC feedback control and coupling $P_{ref}$ to a Battery Energy Storage System (BESS), wherein the BESS generates a BESS power output ($P_{BESS}$);
   generating an output grid power ($P_{grid}$) by combining $P_{BESS}$ and another output of the SoC feedback control; and
   receiving, by the electrical grid, output grid power $P_{grid}$.

13. The method of claim 12, wherein the PV module comprises a PV array and a boost converter.

14. The method of claim 12, wherein the MR filter is a non-parametric smoother that utilizes a machine learning concept of linear regression to smooth out solar PV variations at every time step.

15. The method of claim 14, wherein a window size of the MR filter determines training values of the linear regression.

16. The method of claim 12, wherein a larger window size of the MR filter causes a higher degree of PV power smoothing.

* * * * *